United States Patent
Nath et al.

(10) Patent No.: US 10,895,634 B2
(45) Date of Patent: Jan. 19, 2021

(54) ELECTRONIC DEVICES HAVING MILLIMETER WAVE RANGING CAPABILITIES

(71) Applicant: Apple Inc., Cupertino, CA (US)

(72) Inventors: Jayesh Nath, Milpitas, CA (US); Simone Paulotto, Redwood City, CA (US); Mario Martinis, Cupertino, CA (US); Eduardo Jorge Da Costa Bras Lima, Sunnyvale, CA (US); Andrea Ruaro, Campbell, CA (US); Carlo Di Nallo, Belmont, CA (US); Matthew A. Mow, Los Altos, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 15/901,564

(22) Filed: Feb. 21, 2018

(65) Prior Publication Data

US 2019/0257933 A1    Aug. 22, 2019

(51) Int. Cl.
*G01S 13/08* (2006.01)
*H01Q 21/22* (2006.01)
(Continued)

(52) U.S. Cl.
CPC .............. *G01S 13/08* (2013.01); *G01S 7/006* (2013.01); *G01S 7/04* (2013.01); *G01S 13/10* (2013.01);
(Continued)

(58) Field of Classification Search
CPC .......... G01S 13/08; G01S 13/10; G01S 19/13; G01S 2013/0245; G01S 2013/0254;
(Continued)

(56) References Cited

U.S. PATENT DOCUMENTS 8,493,274 B2    7/2013    Raura
9,627,769 B2    4/2017    Koo et al.
(Continued)

FOREIGN PATENT DOCUMENTS

CN    103339796 A    10/2013
CN    204539638 U    8/2015
(Continued)

OTHER PUBLICATIONS

Siwen Yong et al., U.S. Appl. No. 15/707,721, filed Sep. 18, 2017.
(Continued)

*Primary Examiner* — Timothy A Brainard
(74) *Attorney, Agent, or Firm* — Treyz Law Group, P.C.; Michael H. Lyons; Tianyi He

(57) ABSTRACT

An electronic device such as a wristwatch may be provided with a phased antenna array for conveying first signals at a first frequency between 10 GHz and 300 GHz and a non-millimeter wave antenna for conveying second signals at a second frequency below 10 GHz. The device may include conductive housing sidewalls and a display. Conductive structures in the display and the conductive housing sidewalls may define a slot element in the non-millimeter wave antenna. The phased antenna array may be mounted within the slot element, aligned with a spatial filter in the display, or aligned with a dielectric window in the conductive housing sidewalls. Control circuitry may process signals transmitted by the phased antenna array and a reflected version of the transmitted signals that has been received by the phased antenna array to detect a range between the device and an external object.

14 Claims, 11 Drawing Sheets

(51) Int. Cl.
*G01S 7/04* (2006.01)
*G01S 7/00* (2006.01)
*G01S 13/10* (2006.01)
G01S 13/02 (2006.01)
G01S 19/13 (2010.01)

(52) U.S. Cl.
CPC .............. *H01Q 21/22* (2013.01); *G01S 19/13* (2013.01); *G01S 2013/0245* (2013.01); *G01S 2013/0254* (2013.01)

(58) Field of Classification Search
CPC ........... G01S 7/006; G01S 7/04; H01Q 1/273; H01Q 21/064; H01Q 21/22; H01Q 3/26
See application file for complete search history.

(56) References Cited

U.S. PATENT DOCUMENTS

| | | | |
|---|---|---|---|
| 9,667,290 | B2 | 5/2017 | Ouyang et al. |
| 2003/0189522 | A1 | 10/2003 | Zeilinger |
| 2012/0169550 | A1* | 7/2012 | Schlub .................. H01Q 21/28 343/702 |
| 2016/0248148 | A1 | 8/2016 | Hill et al. |
| 2017/0110787 | A1 | 4/2017 | Ouyang et al. |
| 2017/0125889 | A1 | 5/2017 | Pascolini et al. |
| 2017/0214136 | A1 | 7/2017 | Irci et al. |
| 2017/0222301 | A1 | 8/2017 | Shiu et al. |
| 2017/0302306 | A1 | 10/2017 | Ouyang et al. |
| 2018/0026341 | A1 | 1/2018 | Mow et al. |
| 2018/0048058 | A1 | 2/2018 | Ehman et al. |

FOREIGN PATENT DOCUMENTS

| | | |
|---|---|---|
| CN | 206076482 U | 4/2017 |
| CN | 106842896 A | 6/2017 |
| CN | 107534223 A | 1/2018 |
| CN | 206962004 U | 2/2018 |
| DE | 202017004886 U1 | 1/2018 |
| KR | 10-2013-0010120 | 1/2013 |
| KR | 20-2015-0004010 | 11/2015 |
| WO | 2006120250 | 11/2006 |

OTHER PUBLICATIONS

Andrea Ruaro et al., U.S. Appl. No. 15/698,481, filed Sep. 7, 2017.

* cited by examiner

ELECTRONIC DEVICES HAVING MILLIMETER WAVE RANGING CAPABILITIES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums.

It would therefore be desirable to be able to provide electronic devices with improved wireless communications circuitry such as communications circuitry that supports millimeter and centimeter wave communications.

SUMMARY

An electronic device such as a wristwatch may be provided with wireless circuitry. The wireless circuitry may include antennas arranged in a phased antenna array for conveying first radio-frequency signals at a first frequency between 10 GHz and 300 GHz (e.g., millimeter wave signals at a millimeter wave frequency). The wireless circuitry may include a non-millimeter wave antenna for conveying second radio-frequency signals at a second frequency below 10 GHz.

The electronic device may include conductive housing sidewalls and a touch screen display mounted to the conductive housing sidewalls. The touch screen display may display images and gather touch input. The touch screen display may include a display cover layer and a display module. Conductive structures in the display module and the conductive housing sidewalls may define a slot element in the non-millimeter wave antenna.

In one suitable arrangement, the phased antenna array may be mounted within the slot element of the non-millimeter wave antenna for conveying the first radio-frequency signals at the first frequency through the display cover layer. If desired, a spatial filter such as a frequency selective surface may be formed in the conductive structures of the display module. The spatial filter may have a passband that includes the first frequency. In another suitable arrangement, the phased antenna array may be mounted below the display module and may convey the first radio-frequency signals at the first frequency through the display module via the spatial filter. If desired, a dielectric window may be formed in one of the conductive housing sidewalls. In another suitable arrangement, the phased antenna array may be aligned with the dielectric window and may convey the first radio-frequency signals at the first frequency through the dielectric window.

Control circuitry in the electronic device may perform spatial ranging operations on external objects using the phased antenna array and the first radio-frequency signals if desired. For example, the control circuitry may control millimeter wave circuitry coupled to the phased antenna array to transmit millimeter wave ranging signals (e.g., radio-frequency signals having a predetermined sequence of pulses based on a ranging or object detection protocol at the first frequency). The phased antenna array may receive a reflected version of the transmitted millimeter wave ranging signals that have reflected off of external objects in the vicinity of the electronic device. The control circuitry may process the transmitted millimeter wave ranging signals and the reflected version of the transmitted millimeter wave ranging signals received by the phased antenna array to detect a range between the electronic device and the external objects in the vicinity of the electronic device. The electronic device may include sensor circuitry that gathers sensor data. If desired, the control circuitry may identify a predetermined spatial event based on the detected range and the sensor data. In response to identifying the predetermined spatial event, the control circuitry may control the electronic device issue a notification or alert to a user (wearer) of electronic device 10 and/or to other persons or entities.

DETAILED DESCRIPTION

Figure 1:
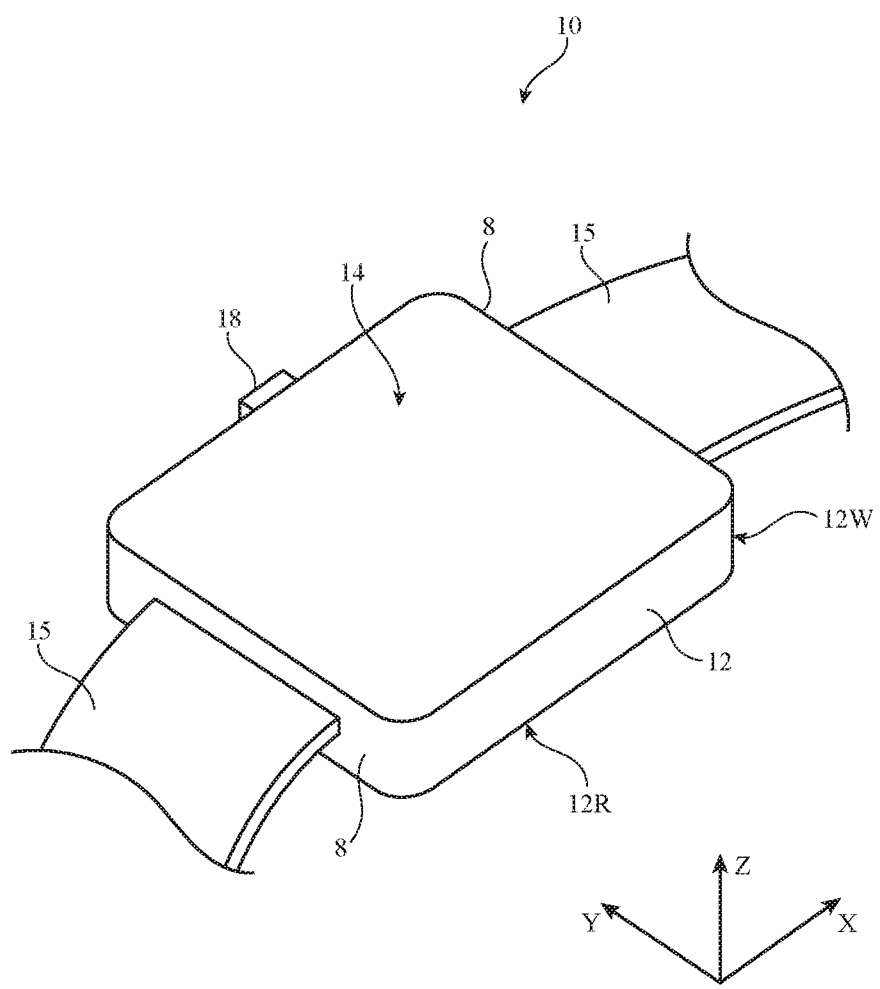
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz.

The antennas may also include dedicated antennas that are used for handling radio-frequency communications at frequencies lower than centimeter wave frequencies (e.g., signals at frequencies less than 10 GHz). Antennas for handling radio-frequency communications at these frequencies may include cellular telephone antennas, wireless local area network, and satellite navigation system antennas. These antennas may, for example, be formed from electrical components such as displays, touch sensors, near-field communications antennas, wireless power coils, peripheral antenna resonating elements, and device housing structures. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at the front side (face) of device 10. Housing 12 may have a rear housing wall such as rear wall 12R that opposes front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics. Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or the rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc. Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 15. Strap 15 may be used to hold device 10 against a user's wrist (as an example). Strap 15 may sometimes be referred to herein as wrist strap 15. In the example of FIG. 1, wrist strap 15 is connected to opposing sides 8 of device 10. Conductive housing sidewalls 12W on sides 8 of device 10 may include attachment structures for securing wrist strap 15 to housing 12 (e.g., lugs or other attachment mechanisms that configure housing 12 to receive wrist strap 15). Configurations that do not include straps may also be used for device 10.

Figure 2:
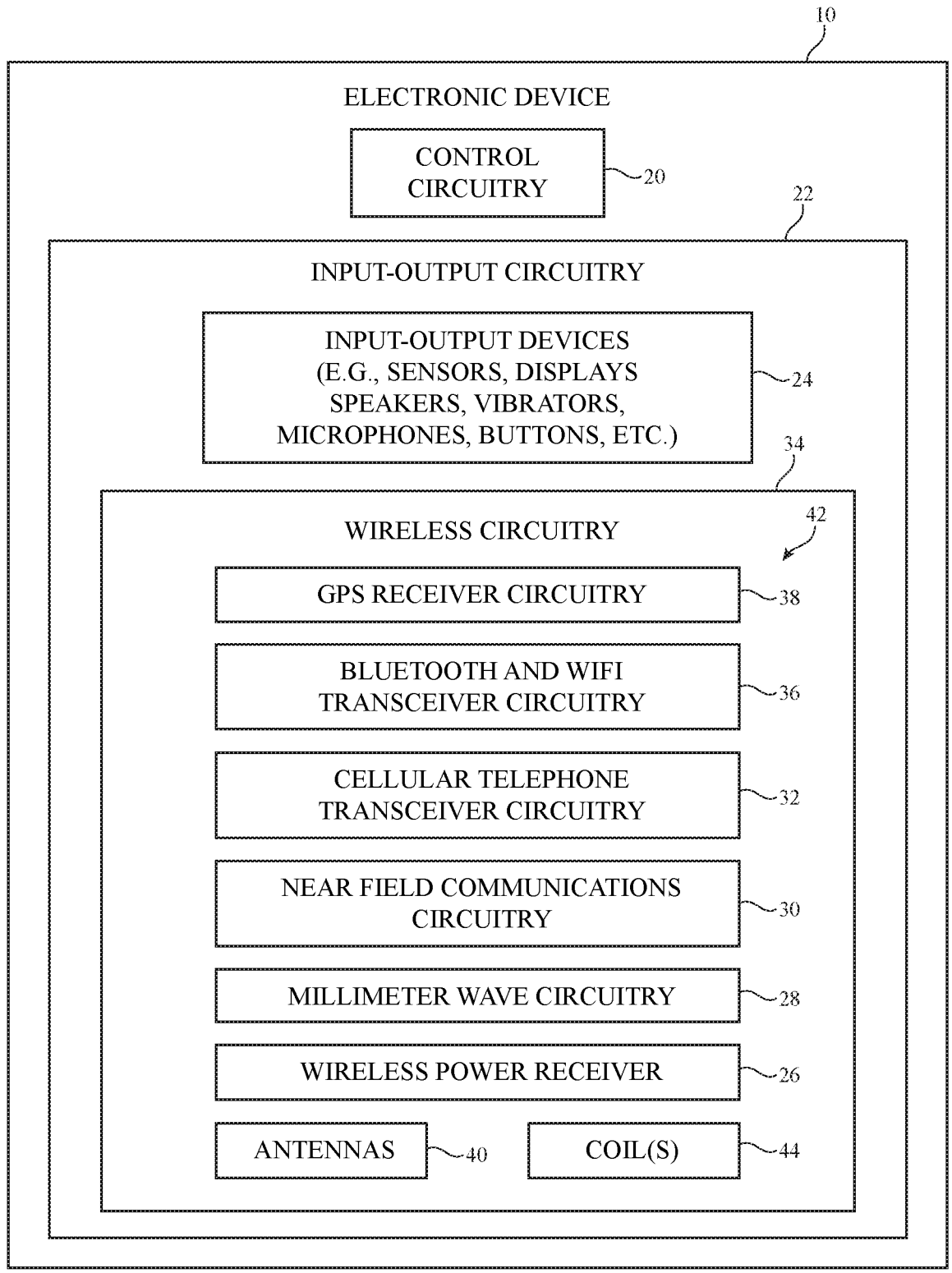
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include storage and processing circuitry such as control circuitry 20. Control circuitry 20 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. This processing circuitry may be based on one or more microprocessors, microcontrollers, digital signal processors, application specific integrated circuits, etc.

Control circuitry 20 may be used to run software on device 10, such as internet browsing applications, voice-over-internet-protocol (VOIP) telephone call applications, email applications, media playback applications, operating system functions, etc. To support interactions with external equipment, control circuitry 20 may be used in implementing communications protocols. Communications protocols that may be implemented using control circuitry 20 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna ranging protocols (e.g., radio detection and ranging (RADAR) protocols or other desired range detection protocols for signals conveyed at millimeter and centimeter wave frequencies), etc.

Device 10 may include input-output circuitry 22. Input-output circuitry 22 may include input-output devices 24. Input-output devices 24 may be used to allow data to be supplied to device 10 and to allow data to be provided from device 10 to external devices. Input-output devices 24 may include user interface devices, data port devices, and other input-output components. For example, input-output devices 24 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include coil 44 and wireless power receiver 26 for receiving wirelessly transmitted power from a wireless power adapter. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 42 for handling various radio-frequency communications bands. For example, circuitry 34 may include transceiver circuitry 38, 36, 32, 30, and 28. Transceiver circuitry 36 may be wireless local area network transceiver circuitry. Transceiver circuitry 36 may handle 2.4 GHz and 5 GHz bands for WiFi® (IEEE 802.11) communications or other wireless local area network (WLAN) bands and may handle the 2.4 GHz Bluetooth® communications band or other wireless personal area network (WPAN) bands.

Wireless circuitry 34 may use cellular telephone transceiver circuitry 32 for handling wireless communications in frequency ranges such as a low communications band from 600 to 960 MHz, a midband from 1400 MHz or 1500 MHz to 2170 or 2200 MHz (e.g., a midband with a peak at 1700 MHz), and a high band from 2200 or 2300 to 2700 MHz (e.g., a high band with a peak at 2400 MHz) or other communications bands between 600 MHz and 4000 MHz or other suitable frequencies (as examples). Circuitry 32 may handle voice data and non-voice data.

Millimeter wave circuitry 28 (sometimes referred to as extremely high frequency (EHF) transceiver circuitry 28, transceiver circuitry 28, or millimeter wave transceiver circuitry) may support communications at frequencies between about 10 GHz and 300 GHz. For example, millimeter wave circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter wave circuitry 28 may support communications in an IEEE K communications band between about 18 GHz and 27 GHz, a $K_a$ communications band between about 26.5 GHz and 40 GHz, a Ku communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or 5th generation mobile networks or 5th generation wireless systems (5G) communications bands between 27 GHz and 90 GHz. If desired, circuitry 28 may support communications at multiple frequency bands between 10 GHz and 300 GHz such as a first band from 27.5 GHz to 28.5 GHz, a second band from 37 GHz to 41 GHz, and a third band from 57 GHz to 71 GHz, or other communications bands between 10 GHz and 300 GHz. Circuitry 28 may be formed from one or more integrated circuits (e.g., multiple integrated circuits mounted on a common printed circuit in a system-in-package device, one or more integrated circuits mounted on different substrates, etc.).

While circuitry 28 is sometimes referred to herein as millimeter wave circuitry 28, millimeter wave circuitry 28 may handle communications at any desired communications bands at frequencies between 10 GHz and 300 GHz (e.g., circuitry 28 may transmit and receive radio-frequency signals in millimeter wave communications bands and/or centimeter wave communications bands). In one suitable arrangement, millimeter wave circuitry 28 may perform spatial ranging operations using millimeter and/or centimeter wave signals to detect or estimate a range between device 10 and external objects in the surroundings of device 10 (e.g., objects external to housing 12 and device 10 such as the body of the user or other persons, animals, furniture, walls, or other objects or obstacles in the vicinity of device 10).

Wireless circuitry 34 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 46 (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Millimeter wave circuitry 28 may convey signals that travel (over short distances) between a transmitter and a receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® or Bluetooth® communications band at 5.0 GHz, and one or more cellular telephone communications bands such as a cellular telephone midband between 1500 MHz and 2170 MHz. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can be arranged in phased antenna arrays for handling millimeter and centimeter wave communications.

It may be desirable to implement at least some of the antennas in device 10 using portions of electrical components that would otherwise not be used as antennas and that support additional device functions. As an example, it may be desirable to induce antenna currents in components such as display 14 (FIG. 1), so that display 14 and/or other electrical components (e.g., a touch sensor, near-field communications loop antenna, conductive display assembly or housing, conductive shielding structures, etc.) can serve as an antenna for Wi-Fi, Bluetooth, GPS, cellular frequencies, and/or other frequencies without the need to incorporate bulky antenna structures in device 10.

Transmission line paths may be used to route antenna signals within device 10 (e.g., signals that are transmitted or received over-the-air by antennas 40). For example, transmission line paths may be used to couple antenna structures 40 to transceiver circuitry 42. Transmission line paths in device 10 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc.

Transmission line paths in device 10 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 20 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40 if desired.

In some configurations, antennas 40 may include antenna arrays such as phased antenna arrays that implement beam steering functions. For example, the antennas that are used in handling millimeter wave and centimeter wave signals for millimeter wave circuitry 28 may be implemented in one or more phased antenna arrays. The radiating elements in a phased antenna array for supporting millimeter wave and centimeter wave communications may be patch antennas, dipole antennas, Yagi (Yagi-Uda) antennas, or other suitable antennas. Millimeter wave circuitry 28 can be integrated with the phased antenna arrays to form integrated phased antenna array and transceiver circuit modules or packages if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays into device 10, each of which is placed in a different location within or on device 10. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas from one or more different locations in device 10 are operated together may also be used (e.g., to form a phased antenna array, etc.).

Figure 3:
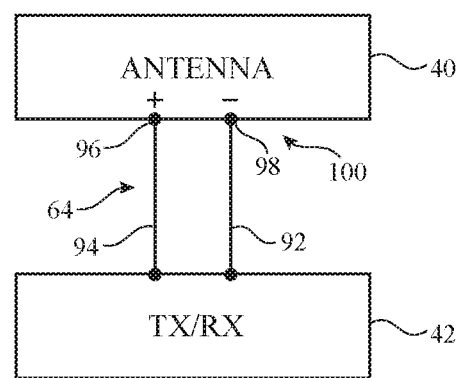
FIG. 3 is a diagram of an illustrative transceiver and antenna in accordance with an embodiment.

A schematic diagram of an antenna 40 coupled to transceiver circuitry 42 is shown in FIG. 3. As shown in FIG. 3, radio-frequency transceiver circuitry 42 may be coupled to antenna feed 100 of antenna 40 using transmission line path 64. Antenna feed 100 may include a positive antenna feed terminal such as positive antenna feed terminal 96 and may include a ground antenna feed terminal such as ground antenna feed terminal 98. Transmission line path 64 may include a positive transmission line signal path such as path 94 that is coupled to terminal 96 and a ground transmission line signal path such as path 92 that is coupled to terminal 98. Transmission line path 64 may be directly coupled to an antenna resonating element and ground for antenna 40 or may be coupled to near-field-coupled antenna feed structures that are used in indirectly feeding a resonating element for antenna 40.

Any desired antenna structures may be used for implementing antennas 40. In one suitable arrangement, different antenna structures may be used for implementing antennas 40 that convey millimeter and centimeter wave signals than are used for implementing antennas 40 that convey radio-frequency signals at lower frequencies.

Figure 4:
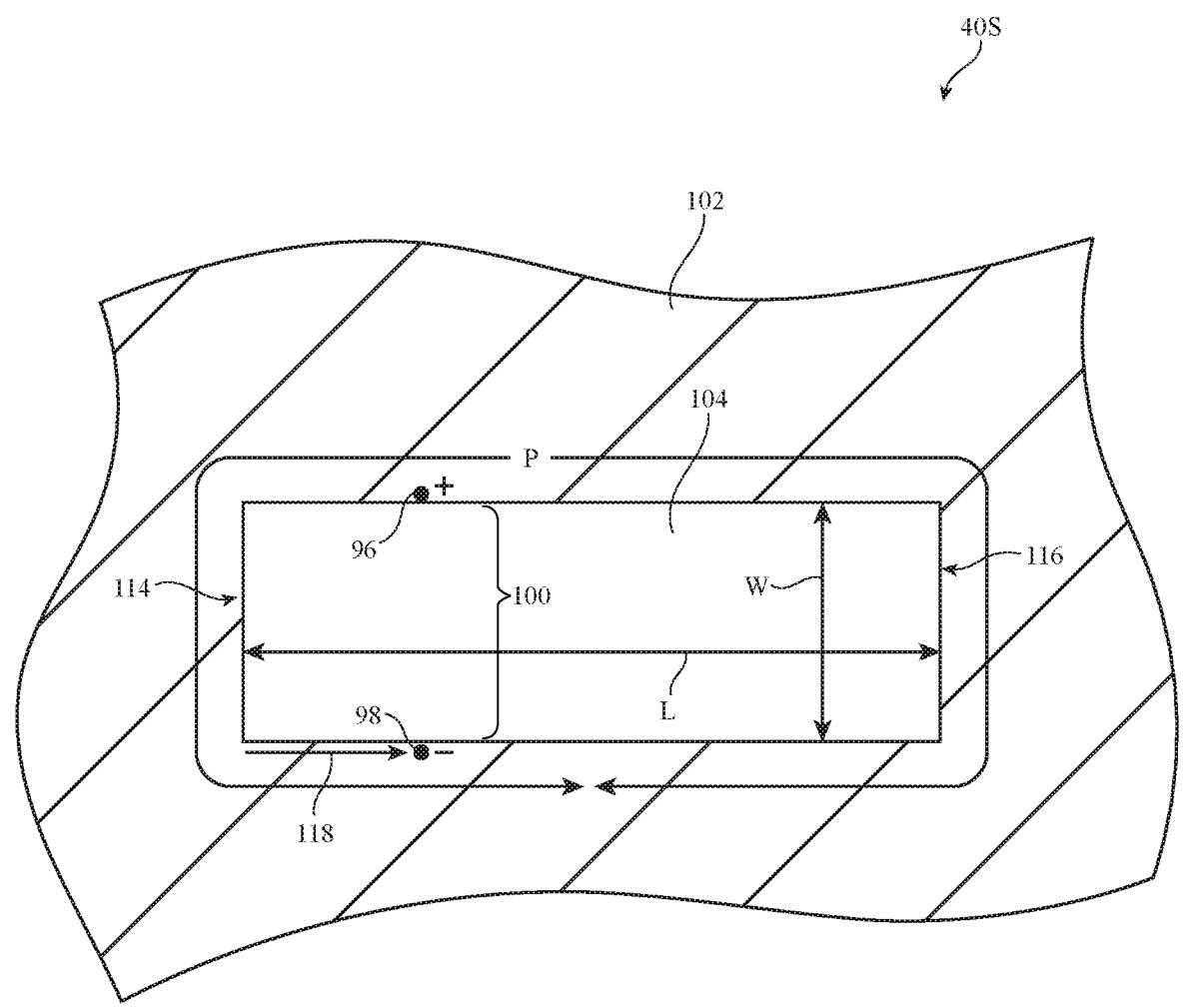
FIG. 4 is a schematic diagram of an illustrative slot antenna for handling non-millimeter wave communications in accordance with an embodiment.

An illustrative antenna 40 for conveying radio-frequency signals at frequencies lower than centimeter and millimeter wave frequencies (e.g., at frequencies lower than 10 GHz) is shown in FIG. 4. As shown in FIG. 4, antennas 40 in device 10 may include an antenna 40S that handles radio-frequency signals at frequencies lower than 10 GHz. Although antenna 40S handles frequencies below both centimeter wave and millimeter wave frequencies (i.e., frequencies below 10 GHz), antenna 40S may sometimes be referred to herein as non-millimeter wave antenna 40S. Non-millimeter wave antenna 40S may, for example, be used to convey radio-frequency signals in cellular telephone, WLAN, WPAN, and/or GPS frequency bands.

In one suitable arrangement which is sometimes described herein as an example, non-millimeter wave antenna 40S may be implemented using slot antenna structures (e.g., non-millimeter wave antenna 40S may be a slot antenna and may sometimes be referred to herein as slot antenna 40S or non-millimeter wave slot antenna 40S). This is merely illustrative and, in general, any desired antenna structures may be used for implementing non-millimeter wave antenna 40S.

As shown in FIG. 4, non-millimeter wave antenna 40S may include a conductive structure such as structure 102 that has been provided with a dielectric opening such as dielectric opening 104. Openings such as opening 104 of FIG. 4 are sometimes referred to as slots, slot antenna resonating elements, or slot elements. In the configuration of FIG. 4, opening 104 is a closed slot, because portions of conductive structure 102 completely surround and enclose opening 104. Open slot antennas may also be formed in conductive materials such as conductive structure 102 (e.g., by forming an opening in the right-hand or left-hand end of conductive structure 102 so that opening 104 protrudes through conductive structure 102).

Antenna feed 100 for non-millimeter wave antenna 40S may be formed using positive antenna feed terminal 96 and ground antenna feed terminal 98. In general, the frequency response of an antenna is related to the size and shapes of the conductive structures in the antenna. Slot antennas such as non-millimeter wave antenna 40S of FIG. 4 tend to exhibit response peaks when slot perimeter P is equal to the effective wavelength of operation of the antenna (e.g. where perimeter P is equal to two times length L plus two times width W and the effective wavelength takes into account dielectric effects associated with any dielectric materials within slot 104). Antenna currents may flow between feed terminals 96 and 98 around perimeter P of slot 104. As an example, where slot length L>>slot width W, the length of non-millimeter wave antenna 40S will tend to be about half of the length of other types of antennas such as inverted-F antennas configured to handle signals at the same frequency. Given equal antenna volumes, non-millimeter wave antenna 40S will therefore be able to handle signals at approximately twice the frequency of other antennas such as inverted-F antennas, for example.

Feed 100 may be coupled across slot 104 at a location between opposing edges 114 and 116 of slot 104. For example, feed 100 may be located at a distance 118 from side 114 of slot 104. Distance 118 may be adjusted to match the impedance of non-millimeter wave antenna 40S to the impedance of the corresponding transmission line (e.g., transmission line path 64 of FIG. 3). For example, the antenna current flowing around slot 104 may experience an impedance of zero at edges 114 and 116 of slot 104 (e.g., a short circuit impedance) and an infinite (open circuit) impedance at the center of slot 104 (e.g., at a fundamental frequency of the slot). Distance 118 may be located between the center of slot 104 and edge 114 at a location where the antenna current experiences an impedance that matches the impedance of the corresponding transmission line, for example (e.g., distance 118 may be between 0 and ¼ of the wavelength of operation of non-millimeter wave antenna 40S).

The example of FIG. 4 is merely illustrative. In general, slot 104 may have any desired shape (e.g., where the perimeter P of slot 104 defines radiating characteristics of non-millimeter wave antenna 40S). For example, slot 104 may have a meandering shape with different segments extending in different directions, may have straight and/or curved edges, etc. Conductive structures 102 may be formed from any desired conductive electronic device structures. For example, conductive structures 102 may include conductive traces on printed circuit boards or other substrates, sheet metal, metal foil, conductive structures associated with display 14 (FIG. 1), conductive portions of housing 12 (e.g., conductive housing sidewalls 12W of FIG. 1), or other conductive structures within device 10. In one suitable arrangement, different sides (edges) of slot 104 may be defined by different conductive structures.

Due to the substantial over-the-air attenuation of signals at frequencies greater than 10 GHz, antennas 40 in device 10 for handling millimeter and centimeter wave frequencies greater than 10 GHz may be formed in phased antenna arrays that implement beam steering functions. Implementing these antennas in phased antenna arrays may allow for the overall gain of the millimeter and centimeter wave signals to be greater than would otherwise be achievable using a single antenna (e.g., due to constructive interference between individual antennas in the phased antenna array), thereby helping to counteract over-the-air attenuation at these frequencies (e.g., the gain of the signals may be proportional to the number of antennas of the array). Beam steering techniques may be used to allow the phased antenna array to cover all angles within its field of view (e.g., because the increase in gain associated with using a phased antenna array also narrows the area of coverage at any given time).

Figure 5:
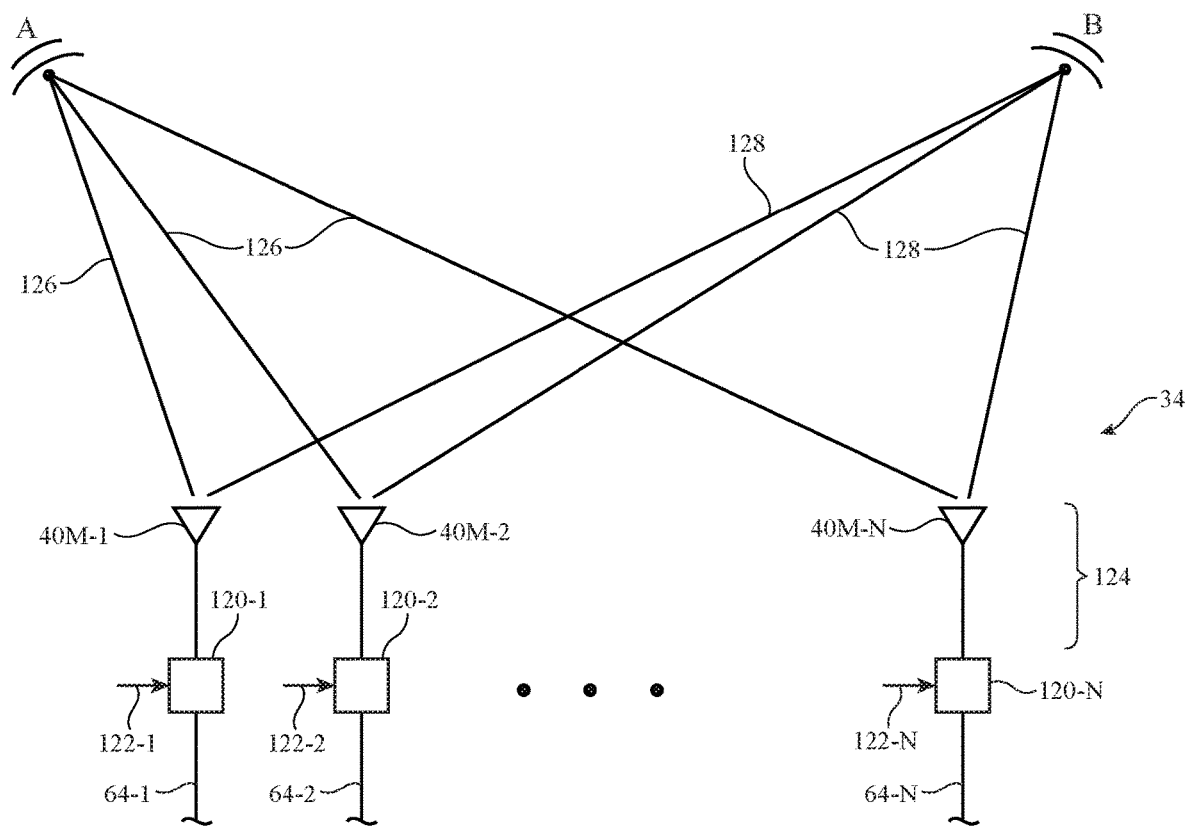
FIG. 5 is a diagram of an illustrative phased antenna array that may be adjusted using control circuitry to direct a beam of millimeter or centimeter wave signals in accordance with an embodiment.

FIG. 5 shows how antennas 40 for handling radio-frequency signals at frequencies greater than 10 GHz (e.g., millimeter wave and centimeter wave signals) may be formed in a phased antenna array. As shown in FIG. 5, wireless circuitry 34 may include antennas 40 for handling frequencies greater than 10 GHz such as antennas 40M. Although antennas 40M may generally handle millimeter wave signals and/or centimeter wave signals between 10 GHz and 300 GHz, antennas 40M may sometimes be referred to herein as millimeter wave antennas 40M for the sake of simplicity.

As shown in FIG. 5, wireless circuitry 34 may include a phased antenna array 124 (sometimes referred to herein as array 124, antenna array 124, or array 124 of millimeter wave antennas 40M). Phased antenna array 124 may include a number N of millimeter wave antennas 40M. Phased antenna array 124 may be coupled to signal paths such as transmission line paths 64 (e.g., one or more radio-frequency transmission lines). For example, a first millimeter wave antenna 40M-1 in phased antenna array 124 may be coupled to a first transmission line path 64-1, a second millimeter wave antenna 40M-2 in phased antenna array 124 may be coupled to a second transmission line path 64-2, an Nth millimeter wave antenna 40M-N in phased antenna array 124 may be coupled to an Nth transmission line path 64-N, etc.

Millimeter wave antennas 40M in phased antenna array 124 may be arranged in any desired number of rows and columns or in any other desired pattern (e.g., the antennas need not be arranged in a grid pattern having rows and columns). In one suitable arrangement which is sometimes described herein as an example, phased antenna array 124 is a one-by-N array of millimeter wave antennas 40M (e.g., antennas 40M in phased antenna array 124 may be arranged in a single row or column).

During signal transmission operations, transmission line paths 64 may be used to supply signals (e.g., radio-frequency signals such as millimeter wave and/or centimeter wave signals) from millimeter wave circuitry 28 (FIG. 2) to phased antenna array 124 for wireless transmission to external wireless equipment. During signal reception operations, transmission line paths 64 may be used to convey signals received at phased antenna array 124 from external equipment to millimeter wave circuitry 28 (FIG. 2).

The use of multiple millimeter wave antennas 40M in phased antenna array 124 allows beam steering arrangements to be implemented by controlling the relative phases and magnitudes (amplitudes) of the radio-frequency signals conveyed by the antennas. In the example of FIG. 5, millimeter wave antennas 40M each have a corresponding radio-frequency phase and magnitude controller 120 (e.g., a first phase and magnitude controller 120-1 interposed on transmission line path 64-1 may control phase and magnitude for radio-frequency signals handled by millimeter wave antenna 40M-1, a second phase and magnitude controller 120-2 interposed on transmission line path 64-2 may control phase and magnitude for radio-frequency signals handled by millimeter wave antenna 40M-2, an Nth phase and magnitude controller 120-N interposed on transmission line path 64-N may control phase and magnitude for radio-frequency signals handled by millimeter wave antenna 40M-N, etc.).

Phase and magnitude controllers 120 may each include circuitry for adjusting the phase of the radio-frequency signals on transmission line paths 64 (e.g., phase shifter circuits) and/or circuitry for adjusting the magnitude of the radio-frequency signals on transmission line paths 64 (e.g., power amplifier and/or low noise amplifier circuits). Phase and magnitude controllers 120 may sometimes be referred to collectively herein as beam steering circuitry (e.g., beam steering circuitry that steers the beam of radio-frequency signals transmitted and/or received by phased antenna array 124).

Phase and magnitude controllers 120 may adjust the relative phases and/or magnitudes of the transmitted signals that are provided to each of the antennas in phased antenna array 124 and may adjust the relative phases and/or magnitudes of the received signals that are received by phased antenna array 124 from external equipment. The term "beam" or "signal beam" may be used herein to collectively refer to wireless signals that are transmitted and received by phased antenna array 124 in a particular direction. The term "transmit beam" may sometimes be used herein to refer to wireless radio-frequency signals that are transmitted in a particular direction whereas the term "receive beam" may sometimes be used herein to refer to wireless radio-frequency signals that are received from a particular direction.

If, for example, phase and magnitude controllers 120 are adjusted to produce a first set of phases and/or magnitudes for transmitted millimeter wave signals, the transmitted signals will form a millimeter wave transmit beam as shown by beam 126 of FIG. 5 that is oriented in the direction of point A. If, however, phase and magnitude controllers 120 are adjusted to produce a second set of phases and/or magnitudes for the transmitted millimeter wave signals, the transmitted signals will form a millimeter wave transmit beam as shown by beam 128 that is oriented in the direction of point B. Similarly, if phase and magnitude controllers 120 are adjusted to produce the first set of phases and/or magnitudes, wireless signals (e.g., millimeter wave signals in a millimeter wave frequency receive beam) may be received from the direction of point A as shown by beam 126. If phase and magnitude controllers 120 are adjusted to produce the second set of phases and/or magnitudes, signals may be received from the direction of point B, as shown by beam 128.

Each phase and magnitude controller 120 may be controlled to produce a desired phase and/or magnitude based on a corresponding control signal 122 received from control circuitry 20 (FIG. 2) or other control circuitry in device 10 (e.g., the phase and/or magnitude provided by phase and magnitude controller 120-1 may be controlled using control signal 122-1, the phase and/or magnitude provided by phase and magnitude controller 120-2 may be controlled using control signal 122-2, etc.). If desired, control circuitry 20 may actively adjust control signals 122 in real time to steer the transmit or receive beam in different desired directions over time.

When performing millimeter or centimeter wave communications, radio-frequency signals are conveyed over a line of sight path between phased antenna array 60 and external equipment. If the external equipment is located at location A of FIG. 5, phase and magnitude controllers 120 may be adjusted to steer the signal beam towards direction A. If the external equipment is located at location B, phase and magnitude controllers 120 may be adjusted to steer the signal beam towards direction B. In the example of FIG. 5, beam steering is shown as being performed over a single degree of freedom for the sake of simplicity (e.g., towards the left and right on the page of FIG. 5). However, in practice, the beam is steered over two or more degrees of freedom (e.g., in three dimensions, into and out of the page and to the left and right on the page of FIG. 5). When performing spatial ranging operations using phased antenna array 124, the signal beam may be steered towards direction A to detect a range between device 10 and an external object at location A and may be steered towards direction B to detect a range between device 10 and an external object at location B.

If desired, millimeter wave circuitry 28 of FIG. 2 may perform two-way communications with external equipment (e.g., an external wireless communications device such as a cellular telephone, computer, wearable device, wireless access point or base station, etc.) using a millimeter wave communications protocol. When performing two-way communications, millimeter wave circuitry 28 of FIG. 2 may encode wireless data using the millimeter wave communications protocol, may transmit the wireless data to the external equipment at millimeter or centimeter wave frequencies, may receive wireless data transmitted by the external equipment at millimeter or centimeter wave frequencies, and may decode the received wireless data using the millimeter wave communications protocol. Such millimeter wave communications protocols may include, for example, IEEE 802.11ad communications protocols or 5th generation wireless systems (5G) communications protocols.

Spatial ranging operations performed by millimeter wave circuitry 28 may involve one-way communications that do not require an external communications equipment. Spatial ranging operations may include range detection operations, external object detection operations, and/or external object tracking operations, for example. In performing spatial ranging operations, millimeter wave circuitry 28 may transmit a signal such as a sequence (e.g., series) of pulses or other predetermined signals at millimeter or centimeter wave frequencies using phased antenna array 124 (e.g., based on a RADAR protocol or other range or object detection protocol). Millimeter wave circuitry 28 may then wait for receipt of a reflected version of the transmitted signal that has been reflected off of an external object in the vicinity of device 10 (e.g., within a line-of-sight of device 10). Upon receiving the reflected version of the transmitted signal, millimeter wave circuitry 28 or control circuitry 20 (FIG. 2) may compare the transmitted signal (e.g., the sequence of pulses in the transmitted signal) to the received reflected version of the transmitted signal (e.g., the sequence of pulses in the received signal) to identify a distance between device 10 and the external object (e.g., based on a time delay between the transmitted signal and the received signal and the known propagation speed of the signals over the air and using the range or object detection protocol). The sequence of pulses may, for example, allow millimeter wave circuitry 28 to identify that any given received signal is a reflected version of the transmitted signal instead of some other signal received at device 10 (e.g., because the sequence of pulses will be the same for the reflected version of the transmitted signal as the known sequence of pulses in the transmitted signal).

In practice, the hardware required to perform spatial ranging operations using millimeter wave circuitry 28 of FIG. 2 may be smaller and less resource-intensive than the hardware required to perform two-way communications using millimeter wave circuitry 28. For relatively small form factor devices such as scenarios where device 10 is implemented as a wristwatch or other wearable device (e.g., as shown in FIG. 1 and described herein by example), there may not be sufficient space within device 10 to form the hardware required to perform two-way communications using millimeter wave circuitry 28. However, there may still be sufficient space within device 10 to allow for millimeter wave circuitry 28 to perform spatial ranging operations using one or more phased antenna arrays 124. In another suitable arrangement, even if there is sufficient space within device 10 to form the hardware required to perform two-way communications using millimeter wave circuitry 28, millimeter wave circuitry 28 may, if desired, include only the hardware necessary for performing spatial ranging operations in order to conserve space within device 10 for use by other components.

Figure 6:
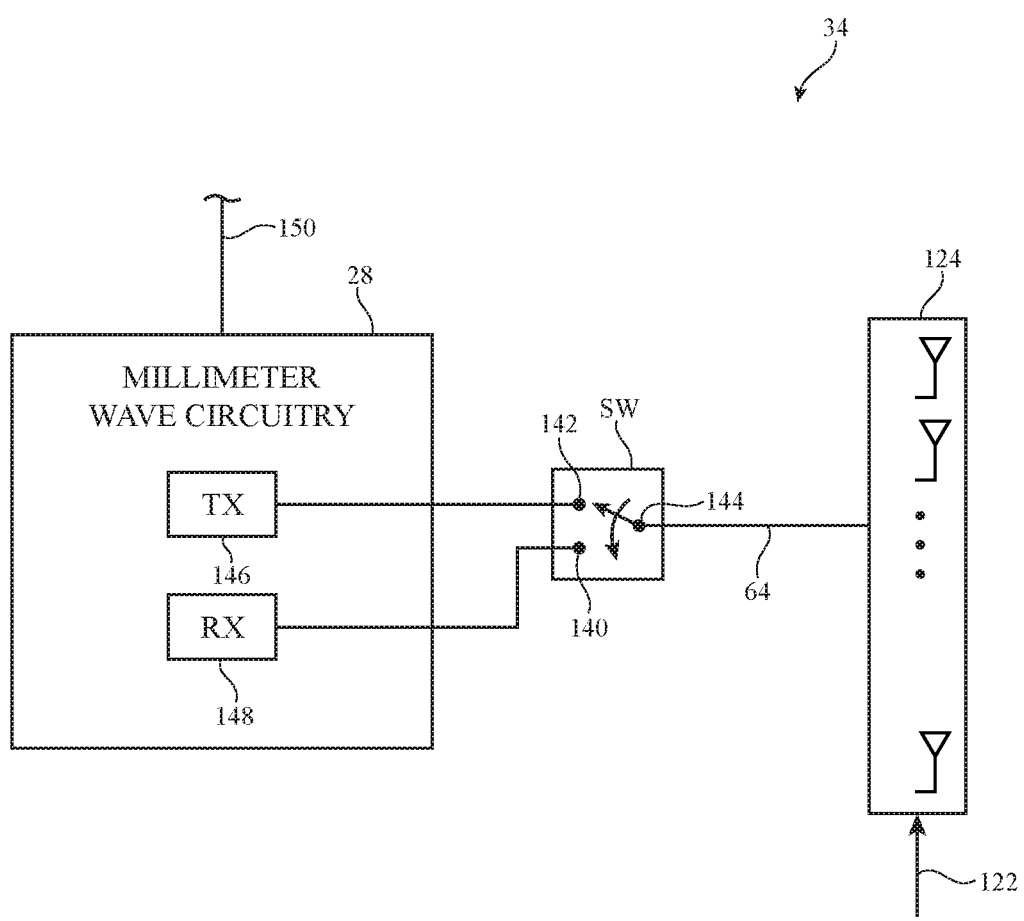
FIG. 6 is a circuit diagram of illustrative wireless circuitry that may perform spatial ranging operations using millimeter and centimeter wave signals and a phased antenna array in accordance with an embodiment.

FIG. 6 is a circuit diagram showing how wireless circuitry 34 may include millimeter wave circuitry for performing spatial ranging operations. As shown in FIG. 6, millimeter wave circuitry 28 may be coupled to phased antenna array 124 over transmission line path 64. A radio-frequency switching circuit such as switch SW may be interposed on transmission line path 64 between millimeter wave circuitry 28 and phased antenna array 124.

Millimeter wave circuitry 28 may include a transmitter such as transmitter 146 and a receiver such as receiver 148 (sometimes referred to herein as millimeter wave transmitter 146 and millimeter wave receiver 148). Transmitter 146 may be coupled to terminal 142 of switch SW. Receiver 148 may be coupled to terminal 140 of switch SW. Phased antenna array 124 may be coupled to terminal 144 of switch SW. Millimeter wave circuitry 28 may be coupled to control circuitry 20 (FIG. 2) over path 150.

Control circuitry 20 may provide control signals over path 150 that control millimeter wave circuitry 28 to perform spatial ranging operations. For example, transmitter 146 may generate a signal at a frequency greater than 10 GHz that includes a predetermined sequence of pulses (e.g., based on range or object detection protocol and/or control signals received over path 150). In another suitable arrangement, millimeter wave circuitry 28 may include baseband circuitry that generates the predetermined sequence of pulses and transmitter 146 may generate a signal at a frequency greater than 10 GHz that includes the pulses. Transmitter 146 may transmit the signal to switch SW.

Millimeter wave circuitry 28 or control circuitry 20 of FIG. 2 may control (toggle) switch SW between a first state at which terminal 142 is coupled to terminal 144 and a second state at which terminal 144 is coupled to terminal 140 (e.g., switch SW may be a single-pole single-throw (SPST) switch). Switch SW may be placed in the first state to couple terminal 144 to terminal 142 during signal transmission. Switch SW may route the signal from transmitter 146 to phased antenna array 124 and phased antenna array 124 may transmit the signal as a transmit beam. Control circuitry 20 of FIG. 2 may provide control signals 122 to phased antenna array 124 to steer the transmit beam in a desired direction (e.g., each antenna in phased antenna array 124 may transmit the same signal using a respective phase and/or magnitude as identified by control signals 122).

After the signal has been transmitted, switch SW may be placed in the second state to couple terminal 144 to terminal 140. Receiver 148 may wait for reception of a reflected version of the transmitted signal from phased antenna array 124. Phased antenna array 124 may receive a reflected version of the transmitted signal that has reflected off of an external object in the vicinity of device 10 (e.g., within a line-of-sight of phased antenna array 124). Switch SW may route the received reflected version of the transmitted signal to receiver 148. The received version of the transmitted signal may be passed to control circuitry 20 of FIG. 2 over path 150 if desired. Millimeter wave circuitry 28 and/or control circuitry 20 may compare the transmitted signal to the received reflected version of the transmitted signal to identify a range between device 10 and the external object and/or to detect the presence of the external object. Switch SW may subsequently be toggled back into the first state and transmitter 146 may transmit another signal to continue to perform spatial ranging operations. Phased antenna array 124 may be steered over all angles within its field of view for performing spatial ranging operations if desired. In this way, millimeter wave circuitry 28 may perform spatial ranging operations using a time division duplex (TDD) scheme in which only one of transmitter 146 and receiver 148 is coupled to phased antenna array 124 at a given time.

Transmitter 146 and receiver 148 may perform spatial ranging operations by transmitting and receiving sequences of pulses at frequencies greater than 10 GHz using a range and object detection protocol (e.g., without modulating the signals using a two-way millimeter wave communications protocol). This may greatly simplify the hardware and space required to implement millimeter wave circuitry 28 relative to scenarios where millimeter wave circuitry 28 performs two-way millimeter wave communications (e.g., using a 5G protocol or a IEEE 802.11ad protocol).

The example of FIG. 6 is merely illustrative. If desired, transmitter 146 and receiver 148 may be coupled to multiple phased antenna arrays (e.g., over respective transmission lines coupled to millimeter wave circuitry 28 through a switch matrix or other switching circuitry having a corresponding number of terminals). If desired, wireless circuitry 34 may include multiple transmitters 146 and receivers 148 coupled to the same phased antenna array 124 or coupled to different phased antenna arrays 124 (e.g., each phased antenna array may have a corresponding transmitter 146 and receiver 148 for performing spatial ranging operations if desired).

In practice, relatively large phased antenna arrays may be required to perform two-way millimeter wave communications operations. For example, two-dimensional arrays of antennas arranged in rows and columns may be required to obtain sufficient gain for performing two-way millimeter wave communications with satisfactory link quality over relatively long distances. However, when performing spatial ranging operations, millimeter wave signals are generally transmitted over shorter distances and do not have the same link quality requirements as two-way millimeter wave communications. Phased antenna arrays for performing spatial ranging operations such as phased antenna array 124 may therefore be relatively small arrays such as one-dimensional arrays that include relatively few antennas (e.g., two antennas, three antennas, four antennas, five antennas, fewer than nine antennas, etc.).

Figure 7:
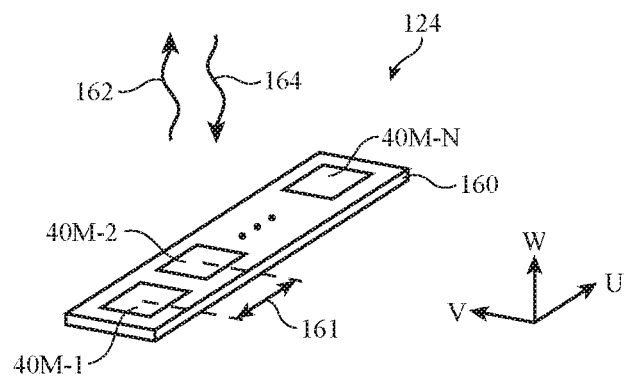
FIG. 7 is a perspective view of an illustrative phased antenna array that may be used to perform spatial ranging operations using millimeter and centimeter wave signals in accordance with an embodiment.
Figure 9:
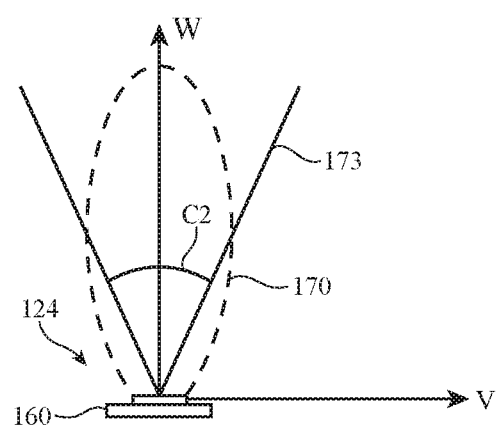

FIG. 7 is a perspective view of an illustrative one-dimensional phased antenna array 124 that may be used by millimeter wave circuitry 28 for performing spatial ranging operations. As shown in FIG. 9, phased antenna array 124 includes a single row or column of N millimeter wave antennas 40M (e.g., a first millimeter wave antenna 40M-1, a second millimeter wave antenna 40M-2, an Nth millimeter wave antenna 40M-N, etc.).

Phased antenna array 124 may be formed on a dielectric substrate such as substrate 160. Substrate 160 may be, for example, a rigid or flexible printed circuit board or other dielectric substrate. Substrate 160 may include multiple stacked dielectric layers (e.g., multiple layers of printed circuit board substrate such as multiple layers of fiberglass-filled epoxy) or may include a single dielectric layer. Substrate 160 may include any desired dielectric materials such as epoxy, plastic, ceramic, glass, foam, or other materials. Millimeter wave antennas 40M in phased antenna array 124 may be mounted at a surface of substrate 160 or may be partially or completely embedded within substrate 160 (e.g., within a single layer of substrate 160 or within multiple layers of substrate 160).

In the example of FIG. 7, millimeter wave antennas 40M are shown as being patch antennas having patch antenna resonating elements formed over an antenna ground plane. The ground plane, patch antenna resonating element, and an optional parasitic element over the patch antenna resonating element may each be formed on separate layers of substrate 160 if desired (e.g., the parasitic element or the patch antenna resonating element may be formed on an exposed surface of substrate 160). If desired, each millimeter wave antenna 40M may be fed using a single feed for covering a single polarization or may be fed using multiple feeds for covering multiple polarizations or other polarizations such as circular or elliptical polarizations. This is merely illustrative and, in general, any other desired antenna structures may be used to implement millimeter wave antennas 40M on phased antenna array 124.

Each millimeter wave antenna 40M in phased antenna array 124 may be laterally separated (e.g., in the V-U plane of FIG. 7) from an adjacent millimeter wave antenna 40M by distance 161. Distance 161 may be, for example, approximately equal to one-half of the effective wavelength of operation of phased antenna array 124 (e.g., one-half of the freespace wavelength of operation after adjusting for contributions from the dielectric materials used to form substrate 160). As one example, distance 161 may be between 1.0 mm and 4.0 mm (e.g., approximately 2.5 mm for signals at 60 GHz).

When performing spatial ranging operations, phased antenna array 124 may transmit radio-frequency signal 162 (e.g., a sequence of pulses transmitted by transmitter 146 of FIG. 6) at a frequency greater than 10 GHz. Phased antenna array 124 may receive a reflected radio-frequency signal 164 that is a version of transmitted radio-frequency signal 162 that has been reflected off of an external object located in the line-of-sight of phased antenna array 124 (e.g., at the location to which the beam of phased antenna array 124 is steered).

Phased antenna array 124 and substrate 160 may sometimes be referred to herein collectively as an antenna module. If desired, millimeter wave circuitry 28 of FIG. 6 or other transceiver circuits may be mounted to the antenna module (e.g., at a surface of substrate 160 or embedded within substrate 160).

Figure 8:
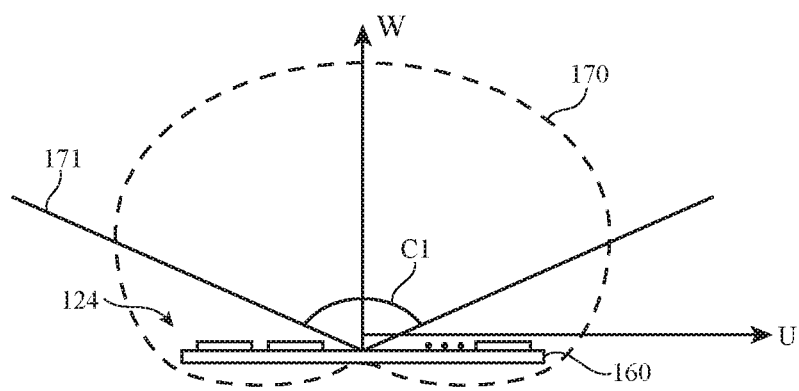
FIGS. 8 and 9 are side views of an illustrative phased antenna array of the type shown in FIG. 7 including an exemplary radiation pattern envelope associated with the phased antenna array in accordance with an embodiment.

FIG. 8 is a side view of the one-dimensional phased antenna array 124 of FIG. 7 (e.g., where the plane of the page in FIG. 8 lies in the U-W plane of FIG. 7). As shown in FIG. 8, phased antenna array 124 may exhibit a radiation pattern associated with a pattern envelope such as pattern envelope 170. Pattern envelope (curve) 170 may be indicative of the gain of radio-frequency signals 162 (FIG. 7) transmitted by phased antenna array 124 when steered over the entire field of view for the phased antenna array (e.g., the beam of signals handled by phased antenna array 124 and steered in a particular direction at any given time only extends across a small subset of pattern envelope 170).

The distance of pattern envelope 170 from the center of phased antenna array 124 is indicative of the gain of the phased antenna array at different beam steering angles. As shown by pattern envelope 170, because phased antenna array 124 is a one-dimensional array having a longitudinal axis aligned with the U-axis of FIG. 8, phased antenna array 124 may exhibit a relatively uniform gain across most of the U-W plane above the U-axis (e.g., as characterized by angle C1 between thresholds 171 beyond which the gain of phased antenna array 124 drops below a predetermined threshold value).

FIG. 9 is a side view of the one-dimensional phased antenna array 124 of FIGS. 7 and 8 (e.g., where the plane of the page in FIG. 9 lies in the V-W plane of FIGS. 7 and 8). As shown in FIG. 9, because phased antenna array 124 is a one-dimensional array having a longitudinal axis aligned perpendicular to the V and W axes of FIG. 9, phased antenna array 124 may exhibit a relatively uniform gain across a relatively narrow slice of the V-W plane above the V-axis (e.g., as characterized by angle C2 between thresholds 173 beyond which the gain of phased antenna array 124 drops below a predetermined threshold value). Angle C1 of FIG. 8 and angle C2 of FIG. 9 may, for example, characterize the field of view of phased antenna array 124. As shown in FIG. 9, angle C2 may be less than angle C1 due to the one-dimensional geometry of phased antenna array 124 in this example (e.g., the field of view of phased antenna array 124 may be relatively narrow when viewed along the longitudinal axis of the phased antenna array but may be relatively wide when viewed perpendicular to the longitudinal axis).

The example of FIGS. 7-9 is merely illustrative. In general, pattern envelope 170 may have any shape (e.g., corresponding to the particular arrangement of millimeter wave antennas 40M in phased antenna array 124, the materials used to form substrate 160, the frequency of operation of phased antenna array 124, etc.). Phased antenna array 60 may include any desired number of millimeter wave antennas 40M arranged in any desired pattern.

Figure 10:
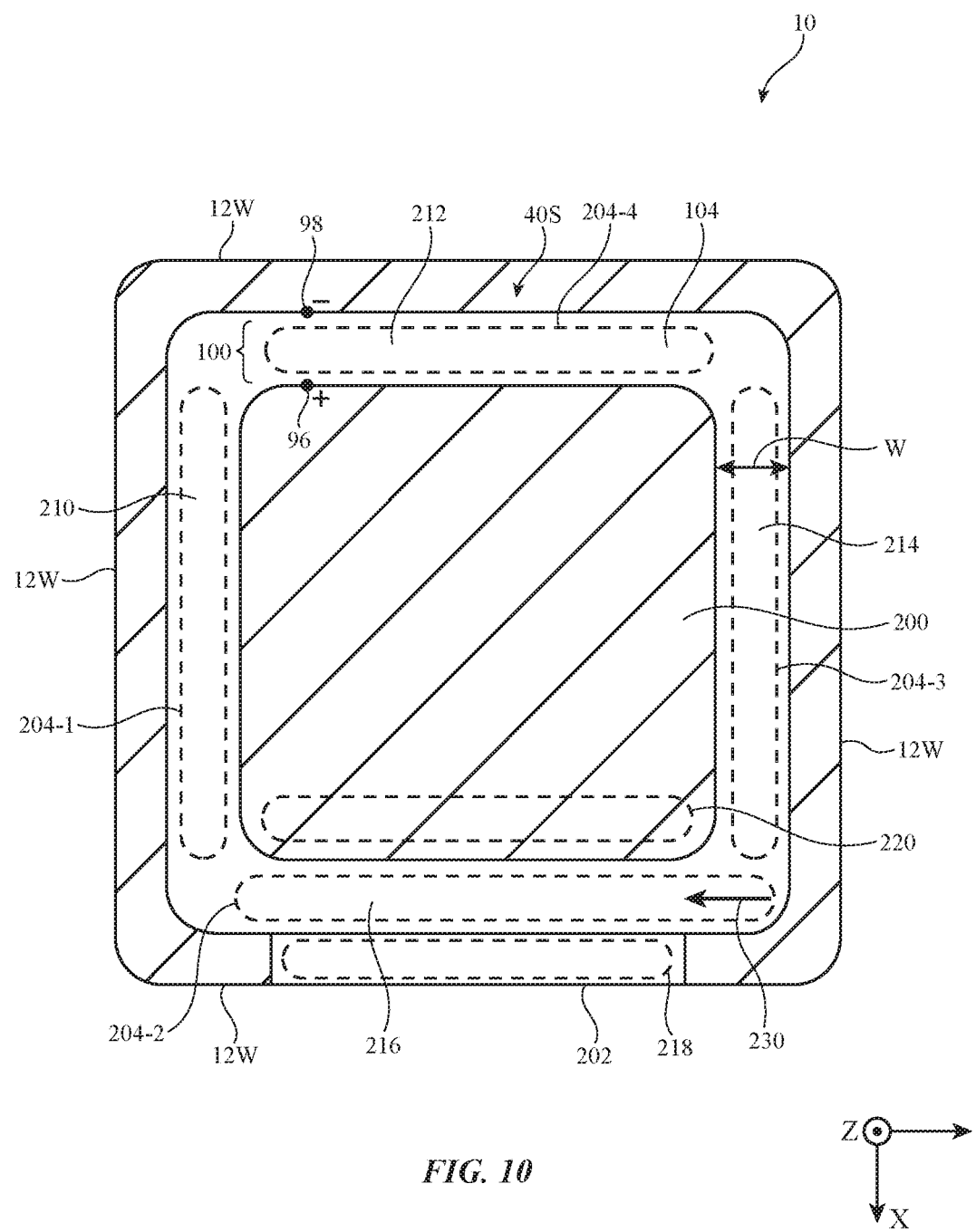
FIG. 10 is a top-down view of an electronic device showing how slot antennas for handling non-millimeter wave communications and phased antenna arrays for performing spatial ranging operations using millimeter and centimeter wave signals may be integrated within an electronic device in accordance with an embodiment.

FIG. 10 is a top-down of device 10 view showing how non-millimeter wave antenna 40S and millimeter wave antennas 40M (e.g., one or more phased antenna arrays 124 of millimeter wave antennas 40M) may be formed within device 10. The plane of the page of FIG. 10 may, for example, lie within the X-Y plane of FIG. 1. In the example of FIG. 10, the cover layer of display 14 is not shown for the sake of clarity.

As shown in FIG. 10, slot 104 of non-millimeter wave antenna 40S may follow a meandering path and may have edges defined by different conductive electronic device structures. Slot 104 may have a first set of edges (e.g., outer edges) defined by conductive housing sidewalls 12W and a second set of edges (e.g., inner edges) defined by conductive structures 200. Conductive structures 200 may, for example, include portions of display 14 (FIG. 1) such as metal portions of a frame or assembly of display 14, touch sensor electrodes within display 14, portions of a near field communications antenna embedded within display 14, ground plane structures within display 14, a metal back plate for display 14, or other conductive structures on or in display 14. Conductive structures 200 may sometimes be referred to herein as conductive display structures 200 or conductive display module structures 200.

In the example of FIG. 10, slot 104 follows a meandering path and has a first segment 210 between edge the left conductive housing sidewall 12W and conductive display structures 200, a second segment 212 between the top conductive housing sidewall 12W and conductive display structures 200, a third segment 214 between the right conductive housing sidewall 12W and conductive display structures 200, and a fourth segment 216 between the bottom conductive housing sidewall 12W and conductive display structures 200. Segments 210 and 214 may extend along parallel longitudinal axes. Segments 212 and 216 may extend between ends of segments 210 and 214 (e.g., along parallel longitudinal axes perpendicular to the longitudinal axes of segments 210 and 214). In this way, slot 104 may be an elongated slot that extends between conductive display structures 200 and multiple conductive housing sidewalls 12W (e.g., to maximize the length of slot 104 for covering relatively low frequency bands such as non-millimeter wave frequency bands using non-millimeter wave antenna 40S, where the perimeter of slot 104 is given by sum of the lengths of the edges of slot 104 that are defined by conductive housing sidewalls 12W and conductive display structures 200). Harmonic modes of slot 104 and/or tuning circuitry such as adjustable matching circuitry coupled to antenna feed 100 or elsewhere on non-millimeter wave antenna 40S may allow non-millimeter wave antenna 40S to concurrently cover multiple frequency bands below 10 GHz (e.g., a cellular telephone frequency band, a wireless local area network frequency band, and/or a GPS frequency band).

The example of FIG. 10 is merely illustrative. If desired, conductive structures (not shown) may bridge width W of slot 104 at one or more locations along the length of slot 104 to shorten the perimeter of slot 104 (e.g., to tune the frequency coverage of non-millimeter wave antenna 40S). The conductive structures may, if desired, be shorted to conductive housing sidewalls 12W and/or conductive display structures 200.

Non-millimeter wave antenna 40S may be fed using antenna feed 100 coupled across width W of slot 104. In the example of FIG. 10, antenna feed 100 is coupled across segment 212 of slot 104. This is merely illustrative and, if desired, feed 100 may be coupled across segments 210, 214, or 216 of slot 104. Ground feed terminal 98 of antenna feed 100 may be coupled to a given conductive housing sidewall 12W and positive feed terminal 96 of antenna feed 100 may be coupled to conductive display structures 200. This is merely illustrative and, if desired, ground feed terminal 98 of antenna feed 100 may be coupled to conductive display structures 200 and positive feed terminal 96 of antenna feed 100 may be coupled to a given conductive housing sidewall 12W.

Antenna feed 100 may convey antenna currents at non-millimeter wave frequencies below 10 GHz around the perimeter of slot 104 (e.g., over conductive housing sidewalls 12W and conductive display structures 200). The antenna currents may generate corresponding radio-frequency signals that are transmitted by non-millimeter wave antenna 40S or may be generated in response to corresponding radio-frequency signals received by non-millimeter wave antenna 40S from external equipment.

Slot 104 may have a uniform width W along its length or may have different widths along its length. If desired, width W may be adjusted to tweak the bandwidth of non-millimeter wave antenna 40S. As an example, width W may be between 0.5 mm and 1.0 mm. Slot 104 may have other shapes if desired (e.g., shapes with more than three segments extending along respective longitudinal axes, fewer than three segments, curved edges, etc.).

In order to optimize space consumption within device 10, one or more phased antenna arrays 124 of FIGS. 5-9 for handling millimeter and centimeter wave communications may be co-located with or adjacent to non-millimeter wave antenna 40S. As shown in FIG. 10, one or more phased antenna arrays 124 (e.g., one-dimensional phased antenna arrays 124 of millimeter wave antennas 40M as shown in FIG. 7) may be formed within slot 104 of non-millimeter wave antenna 40S, as shown by dashed regions 204 (e.g., first dashed region 204-1 in segment 210 of slot 104, second dashed region 204-2 in segment 216 of slot 104, third dashed region 204-3 in segment 214 of slot 104, or fourth dashed region 204-4 in segment 212 of slot 104).

For example, electronic device 10 may include a single phased antenna array 124 located in one of regions 204-1, 204-2, 204-3, or 204-4 or may include two or more phased antenna arrays 124 located in two or more of regions 204-1, 204-2, 204-3, and 204-4. If desired, more than one phased antenna array 124 may be located within a given region 204. Implementing phased antenna arrays 124 as one-dimensional arrays may allow antenna arrays 124 to fit within width W of slot 104 (e.g., without millimeter wave antennas 40M being blocked by conductive display structures 200 or conductive housing sidewalls 12W). The longitudinal axis of phased antenna array 124 may be parallel to (e.g., aligned with) the longitudinal axis of the segment of slot 104 in which the phased antenna array is located, for example.

If desired, one or more phased antenna arrays 124 may be located behind conductive display structures 200, as shown by dashed region 220. In general, the conductive material in conductive display structures 200 may be opaque to radio-frequency signals at millimeter and centimeter wave frequencies. If care is not taken, conductive display structures 200 may prevent transmission of radio-frequency signals to the exterior of device 10 display 14 by a phased antenna array 124 mounted behind conductive display structures 200 in region 220.

In order to allow millimeter wave signals transmitted by a phased antenna array 124 mounted in region 220 to be conveyed through display 14, conductive display structures 200 may include an electromagnetic filter such as a frequency selective filter that passes electromagnetic signals at some radio-frequencies (e.g., within a pass band of the filter) and that blocks electromagnetic signals at other frequencies (e.g., outside of the pass band of the filter). The frequency selective filter may, for example, be a spatial filter that includes conductive structures that are arranged in a periodic manner that defines the pass band of the filter (e.g., to allow transmission of electromagnetic signals within the pass band while blocking electromagnetic signals outside of the pass band). In scenarios where the frequency selective filter is formed using a single layer of conductive material in conductive display structures 200, the frequency selective filter may sometimes be referred to herein as a frequency selective surface (FSS).

In this way, the filter may effectively form an antenna window in conductive display structures 200 and thus display 14 that is transparent at the frequencies of operation of phased antenna array 124 (e.g., an antenna window that is transparent to radio-frequency signals at frequencies greater than 10 GHz). A phased antenna array 124 within region 220 may thereby convey radio-frequency signals through conductive display structures 200 via the filter. The portion of conductive display structures 200 that laterally surrounds the filter (e.g., that laterally surrounds region 220) may remain opaque to radio-frequency signals handled by phased antenna array 124.

If desired, a dielectric window such as dielectric window 202 may be formed in a given conductive housing sidewall 12W. Dielectric window 202 may be formed from plastic, glass, sapphire, ceramic, or any other desired dielectric material. One or more phased antenna arrays 124 may be located on or within dielectric window 202 within region 218. For example, a phased antenna array 124 may be mounted to an inner surface of dielectric window 202 or may be embedded within dielectric window 202. When aligned in this way, the phased antenna array may convey radio-frequency signals at millimeter or centimeter wave frequencies through dielectric window 202. Dielectric window 202 may be formed within other conductive housing sidewalls 12W if desired. Additional dielectric windows may be formed in the other conductive housing sidewalls 12W if desired (e.g., device 10 may include any desired number of dielectric windows in conductive housing sidewalls 12W).

The example of FIG. 10 is merely illustrative. Device 10 may have any desired shape or profile. In general, one or more one-dimensional phased antenna arrays 124 may be located within one or more of regions 204-1, 204-2, 204-3, 204-4, 220, and 218 of FIG. 10. Forming phased antenna arrays 124 at locations such as these may allow the phased antenna arrays to perform spatial ranging operations by transmitting and receiving radio-frequency signals at millimeter wave frequencies through the front face of device 10 and/or through one or more conductive housing sidewalls 12W of device 10 while also optimizing space consumption within device 10 and without sacrificing radio-frequency performance for non-millimeter wave antenna 40S. Additional dielectric windows 202 may be formed in one or more of the other conductive housing sidewalls 12W of device 10 for corresponding phased antenna arrays 124 if desired. Forming multiple phased antenna arrays 124 at multiple locations within device 10 may, for example, allow for greater spatial coverage around device 10 for performing spatial ranging operations than in scenarios where only one phased antenna array 124 is used.

Figure 11:
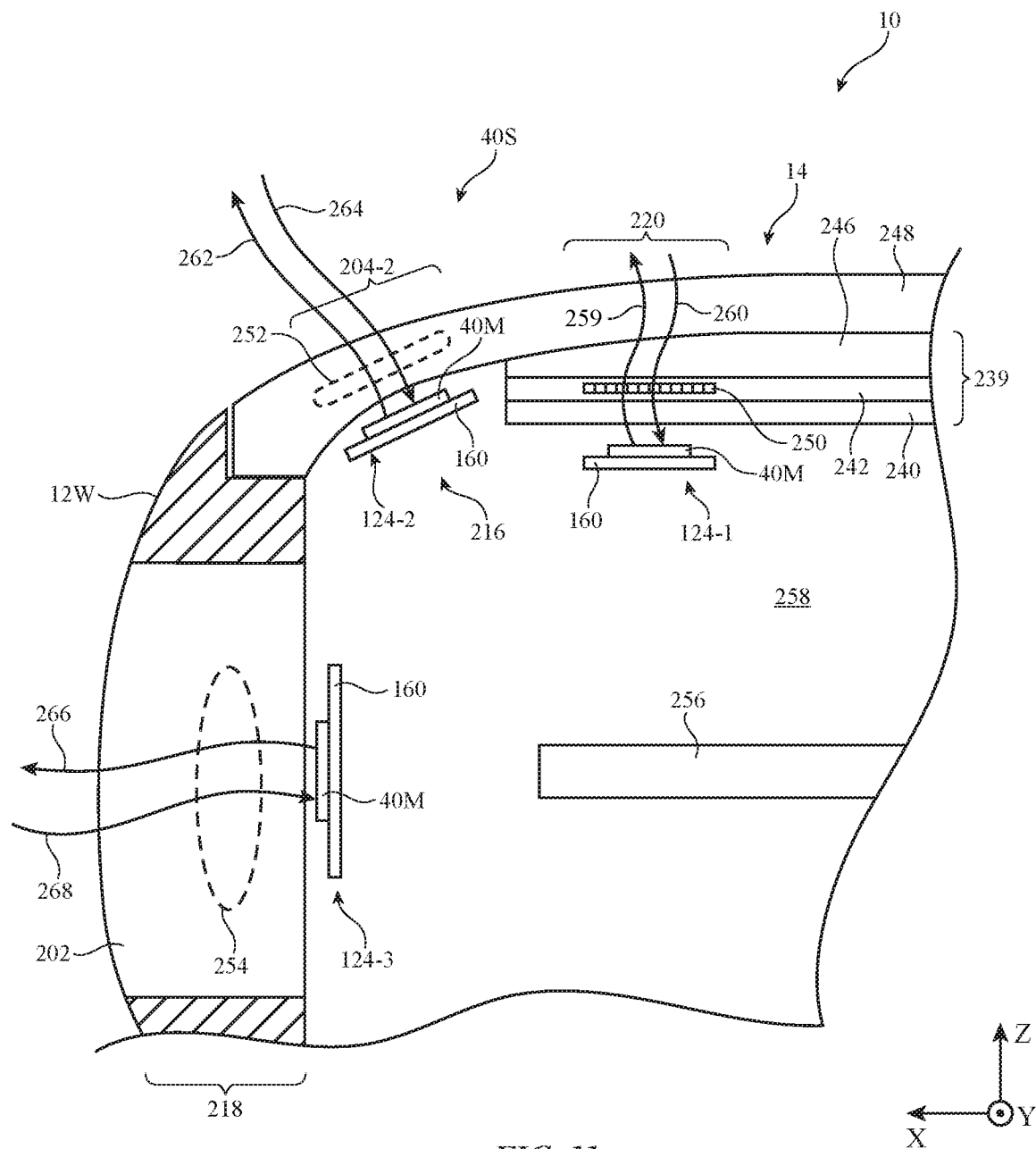
FIG. 11 is a cross-sectional side view of an illustrative electronic device of the type shown in FIG. 10 showing different possible locations for forming phased antenna arrays within the electronic device in accordance with an embodiment.

FIG. 11 is a cross-sectional side view of electronic device 10 showing how phased antenna arrays 124 may be located within different regions such as regions 220, 204-2, and 218 of FIG. 10 (e.g., as taken in the direction of arrow 230 of FIG. 10). As shown in FIG. 11, display 14 may include a display module 239 (sometimes referred to herein as display stack 239, display assembly 239, or active area 239 of display 14) and a display cover layer 248.

Display module 239 may, for example, form an active area or portion of display 14 that displays images and/or receives touch sensor input. The lateral portion of display 14 that does not include display module 239 (e.g., portions of display 14 formed from display cover layer 248 but without an underlying portion of display module 239) may sometimes be referred to herein as the inactive area or portion of display 14 because this portion of display 14 does not display images or gather touch sensor input.

Display module 239 may include conductive components (e.g., conductive components in conductive display structures 200 of FIG. 10) that are used in forming a portion of non-millimeter wave antenna 40S. The conductive components in display module 239 may, for example, have planar shapes (e.g., planar rectangular shapes, planar circular shapes, etc.) and may be formed from metal and/or other conductive material that carries antenna currents. The thin planar shapes of these components and the stacked configuration of FIG. 11 may, for example, capacitively couple these components to each other so that they may operate together at radio frequencies to form conductive display structures 200 of FIG. 10 (e.g., to effectively/electrically form a single conductor).

The components that form conductive display structures 200 of FIG. 10 may include, for example, planar components on one or more display layers in display module 239 such as a first display layer 240, a second display layer 242, a third display layer 246, or other desired layers. As one example, display layer 246 may form a touch sensor for display 14, display layer 242 may form a display panel (sometimes referred to as a display, display layer, or pixel array) for display 14, and display layer 240 may form a near-field communications antenna for device 10 and/or other circuitry for supporting near-field communications (e.g., at 13.56 MHz). The touch sensor formed from display layer 246 may be a capacitive touch sensor and may be formed from a polyimide substrate or other flexible polymer layer with transparent capacitive touch sensor electrodes (e.g., indium tin oxide electrodes), for example. The display panel formed from display layer 242 may be an organic light-emitting diode display layer or other suitable display layer. The near-field communications antenna formed from display layer 240 may be formed from a flexible layer that includes a magnetic shielding material (e.g., a ferrite layer or other magnetic shielding layer) and that includes loops of metal traces. If desired, a conductive back plate, metal shielding cans or layers, and/or a conductive display frame may be formed under and/or around display layer 240 and may provide structural support and/or a grounding reference for the components of display module 239.

Conductive material in layers 240, 242, and 246, a conductive back plate for display 14, conductive shielding layers, conductive shielding cans, and/or a conductive frame for display 14 may be used in forming conductive display structures 200 defining slot 104 of non-millimeter wave antenna 40S, for example. This and/or other conductive material in display 14 used to form conductive display structures 200 may be coupled together using conductive traces, vertical conductive interconnects or other conductive interconnects, and/or via capacitive coupling, for example.

Display cover layer 248 may be formed from an optically transparent dielectric such as glass, sapphire, ceramic, or plastic. Display module 239 may display images (e.g., emit image light) through display cover layer 248 for view by a user and/or may gather touch or force sensor inputs through display cover layer 248. If desired, portions of display cover layer 248 may be provided with opaque masking layers (e.g., ink masking layers) and/or pigment to obscure interior 258 of device 10 from view of the user. Other components 256 such as a main logic board may be located within interior 258 of device 10.

Segment 216 of slot 104 for non-millimeter wave antenna 40S may be defined between conductive housing sidewall 12W and conductive display structures 200 within display module 239 and may have a longitudinal axis that extends parallel to the Y-axis of FIG. 11. Slot 104 (e.g., non-millimeter wave antenna 40S as shown in FIG. 10) may be used to transmit and receive radio-frequency signals in WLAN and/or WPAN bands at 2.4 GHz and 5.0 GHz, in cellular telephone bands between 1.7 GHz and 2.2 GHz, in satellite navigation bands at 1.5 GHz, and/or other desired frequency bands. Additional antennas may also be provided in device 10 to handle these frequency bands and/or other frequency bands.

As shown in FIG. 11, a phased antenna array 124 such as phased antenna array 124-2 may be mounted within region 204-2. Region 204-2 may lie within segment 216 of slot 104 for non-millimeter wave antenna 40S. Phased antenna array 124-2 may, for example, be a one-dimensional array (e.g., as shown in FIGS. 7-9) that has a longitudinal axis that extends parallel to the Y-axis of FIG. 11 and parallel to the longitudinal axis of segment 216 of slot 104 (e.g., as shown by region 204-2 in FIG. 10).

If desired, phased antenna array 124-2 may be located adjacent to display cover layer 248 (e.g., may be separated from display cover layer 248 by a gap). In this scenario, millimeter wave antennas 40M on phased antenna array 124-2 may be interposed between substrate 160 and display cover layer 248 or substrate 160 may be interposed between millimeter wave antennas 40M on phased antenna array 124-2 and display cover layer 248 (e.g., phased antenna array 124-2 may be flipped with respect to the orientation shown in FIG. 11).

In another suitable arrangement, phased antenna array 124-2 may be in contact with the interior surface of display cover layer 248 (e.g., other structures may bias or press phased antenna array 124-2 against the interior surface of display cover layer 248 or an opaque masking layer on display cover layer 248 and/or phased antenna array 124-2 may be attached to the interior surface of display cover layer 248 or an opaque masking layer on display cover layer 248 using adhesive). In this scenario, substrate 160 of phased antenna array 124-2 may be attached to (e.g., in direct contact with) display cover layer 248 or an opaque masking layer on display cover layer 248 (e.g., substrate 160 may be interposed between millimeter wave antennas 40M and display cover layer 248) or millimeter wave antennas 40M in phased antenna array 124-2 may be attached to display cover layer 248 or an opaque masking layer on display cover layer 248 (e.g., millimeter wave antennas 40M may be interposed between substrate 160 and display cover layer 248). If desired, substrate 160 may be omitted and millimeter wave antennas 40M in phased antenna array 124-2 may be mounted directly onto (e.g., printed onto) display cover layer 248 (e.g., display cover layer 248 may serve as a substrate for millimeter wave antennas 40M in phased antenna array 124-2).

In another suitable arrangement, phased antenna array 124-2 may be embedded (e.g., molded) within display cover layer 248 as shown by dashed region 252. In this scenario, millimeter wave antennas 40M and substrate 160 of phased antenna array 124-2 may be embedded within region 252 of display cover layer 248 or millimeter wave antennas 40M may be embedded within region 252 of display cover layer 248 without substrate 160 (e.g., display cover layer 248 may serve as the substrate for millimeter wave antennas 40M in phased antenna array 124-2). If desired, combinations of these arrangements may be used. For example, different portions of phased antenna array 124-2 may be in direct contact with a surface of display cover layer 248, separated from display cover layer 248 by a gap, and/or embedded within display cover layer 248.

Phased antenna array 124-2 may transmit radio-frequency signals 262 through display cover layer 248 at millimeter or centimeter wave frequencies for performing spatial ranging operations. Phased antenna array 124-2 may receive radio-frequency signals 264 through display cover layer 248 at millimeter or centimeter wave frequencies that are a reflected version of transmitted radio-frequency signals 262 that have reflected off of an external object within the field of view of phased antenna array 124-2. Radio-frequency signals 262 and 264 may be used by millimeter wave circuitry 28 and/or control circuitry 20 (FIG. 2) to detect a range to the external object through display cover layer 248, for example.

As shown in FIG. 11, dielectric window 202 may be formed in conductive housing sidewall 12W. Dielectric window 202 may extend across some or all of the height of conductive housing sidewall 12W (e.g., in the direction of the Z-axis of FIG. 11). A phased antenna array 124 such as phased antenna array 124-3 may be mounted within region 218. Phased antenna array 124-2 may, for example, be a one-dimensional array (e.g., as shown in FIGS. 7-9) that has a longitudinal axis that extends parallel to the Y-axis of FIG. 11 and parallel to the longitudinal axis of region 218 as shown in FIG. 10. Dielectric window 202 may be covered with an opaque masking layer such as an ink layer, may be pigmented, or may be formed from an optically opaque dielectric material such as ceramic to obscure interior 258 of device 10 from view.

If desired, phased antenna array 124-3 may be located adjacent to dielectric window 202 (e.g., may be separated from dielectric window 202 by a gap). In this scenario, millimeter wave antennas 40M on phased antenna array 124-3 may be interposed between substrate 160 and dielectric window 202 or substrate 160 may be interposed between millimeter wave antennas 40M on phased antenna array 124-3 and dielectric window 202 (e.g., phased antenna array 124-3 may be flipped with respect to the orientation shown in FIG. 11).

In another suitable arrangement, phased antenna array 124-3 may be in contact with the interior surface of dielectric window 202 (e.g., other structures may bias or press phased antenna array 124-3 against the interior surface of dielectric window 202 or an opaque masking layer on dielectric window 202 and/or phased antenna array 124-3 may be attached to the interior surface of dielectric window 202 or an opaque masking layer on dielectric window 202 using adhesive). In this scenario, substrate 160 of phased antenna array 124-3 may be attached to (e.g., in direct contact with) dielectric window 202 or an opaque masking layer on dielectric window 202 (e.g., substrate 160 may be interposed between millimeter wave antennas 40M of phased antenna array 124-3 and dielectric window 202) or millimeter wave antennas 40M may be attached to dielectric window 202 or an opaque masking layer on dielectric window 202 (e.g., millimeter wave antennas 40M of phased antenna array 124-3 may be interposed between substrate 160 and display cover layer 248). If desired, substrate 160 may be omitted and millimeter wave antennas 40M of phased antenna array 124-3 may be mounted directly onto (e.g., printed onto) dielectric window 202 (e.g., dielectric window 202 may serve as a substrate for millimeter wave antennas 40M in phased antenna array 124-3).

In another suitable arrangement, phased antenna array 124-3 may be embedded (e.g., molded) within dielectric window 202 as shown by dashed region 254. In this scenario, millimeter wave antennas 40M and substrate 160 of phased antenna array 124-3 may be embedded within region 254 of dielectric window 202 or millimeter wave antennas 40M may be embedded within region 254 of dielectric window 202 without substrate 160 (e.g., dielectric window 202 may serve as the substrate for millimeter wave antennas 40M in phased antenna array 124-3). If desired, combinations of these arrangements may be used. For example, different portions of phased antenna array 124-3 may be in direct contact with a surface of display cover layer 248, separated from dielectric window 202 by a gap, and/or embedded within dielectric window 202.

Phased antenna array 124-3 may transmit radio-frequency signals 266 through dielectric window 202 at millimeter or centimeter wave frequencies for performing spatial ranging operations. Phased antenna array 124-3 may receive radio-frequency signals 266 through dielectric window 202 at millimeter or centimeter wave frequencies that are a reflected version of transmitted radio-frequency signals 266 that have reflected off of an external object within the field of view of phased antenna array 124-3. Radio-frequency signals 266 and 268 may be used by millimeter wave circuitry 28 and/or control circuitry 20 (FIG. 2) to detect a range to the external object through dielectric window 202, for example.

As shown in FIG. 11, a phased antenna array 124 such as phased antenna array 124-1 may be mounted within region 220 behind display module 239. Phased antenna array 124-1 may, for example, be a one-dimensional array (e.g., as shown in FIGS. 7-9) that has a longitudinal axis that extends parallel to the Y-axis of FIG. 11.

If desired, phased antenna array 124-1 may be located adjacent to the bottom surface of display module 239 (e.g., may be separated from display module 239 by a gap). In this scenario, millimeter wave antennas 40M on phased antenna array 124-1 may be interposed between substrate 160 and display module 239 or substrate 160 may be interposed between millimeter wave antennas 40M on phased antenna array 124-1 and display module 239 (e.g., phased antenna array 124-1 may be flipped with respect to the orientation shown in FIG. 11).

In another suitable arrangement, phased antenna array 124-1 may be in contact with the bottom surface of display module 239 (e.g., other structures may bias or press phased antenna array 124-1 against the bottom surface of display module 239 and/or phased antenna array 124-1 may be attached to the bottom surface of display module 239 using adhesive). In this scenario, substrate 160 of phased antenna array 124-1 may be attached to (e.g., in direct contact with) display module 239 (e.g., substrate 160 may be interposed between millimeter wave antennas 40M of phased antenna array 124-1 and display module 239) or millimeter wave antennas 40M may be attached to display module 239 (e.g., millimeter wave antennas 40M of phased antenna array 124-1 may be interposed between substrate 160 and display module 239). If desired, substrate 160 may be omitted and millimeter wave antennas 40M of phased antenna array 124-1 may be mounted directly onto (e.g., printed onto) a dielectric portion of display module 239 (e.g., portions of display module 239 may serve as a substrate for millimeter wave antennas 40M in phased antenna array 124-1).

If care is not taken, the conductive material in display module 239 may block radio-frequency signals at millimeter and centimeter wave frequencies from being conveyed to/from phased antenna array 124-1. In order to allow radio-frequency signals handled by phased antenna array 124-1 to be conveyed through display module 239, a filter such as frequency selective filter 250 may be formed within region 220 of display module 239 (e.g., on one or more display layers of display module 239 such as display layers 240, 242, 246, or other layers).

Frequency selective filter 250 may pass electromagnetic signals at some radio-frequencies (e.g., frequencies within a pass band of the filter) and may block electromagnetic signals at other frequencies (e.g., frequencies outside of the pass band of the filter). Frequency selective filter 250 may, for example, be a spatial filter that includes conductive structures (e.g., conductive patches) that are separated by dielectric slots and that are arranged with a periodicity that defines the pass band of the filter. In scenarios where the frequency selective filter is formed using a single layer of conductive material in display module 239, the frequency selective filter may sometimes be referred to herein as a frequency selective surface (FSS).

If desired, filter may be formed using multiple conductive layers in display module 239 (e.g., multiple vertically-stacked frequency selective surfaces such as multiple arrays of vertically-stacked conductive patches separated by slots). In scenarios where filter 250 is formed from multiple arrays of vertically-stacked conductive patches separated by slots, the slots may be narrow enough so as not to be visible to a user of device 10 when viewing display 14 at a typical viewing distance, if desired (e.g., the slots may have a width that is 200 microns or less).

Filter 250 may be formed within conductive layers of display module 239 that would otherwise block radio-frequency signals handled by phased antenna array 124-1. The pass band of filter 250 may be aligned with frequency bands of operation of phased antenna array 124-1 (e.g., frequency bands between 10 GHz and 300 GHz) so that filter 250 forms a transparent window in display module 239 for phased antenna array 124-1. In this way, phased antenna array 124-1 may transmit radio-frequency signals 259 through display module 239 via filter 250 at millimeter or centimeter wave frequencies for performing spatial ranging operations. Phased antenna array 124-1 may receive radio-frequency signals 260 through filter 250 at millimeter or centimeter wave frequencies that are a reflected version of transmitted radio-frequency signals 259 that have reflected off of an external object within the field of view of phased antenna array 124-1. Radio-frequency signals 259 and 260 may be used by millimeter wave circuitry 28 and/or control circuitry 20 (FIG. 2) to detect a range to the external object through display module 239 and display cover layer 248, for example.

The example of FIG. 11 is merely illustrative. Device 10 may have any desired shape or profile. In general, phased antenna arrays 124 may be omitted within regions 218, 204-2, and 220 and may be formed elsewhere on device 10 (e.g., within regions 204-1, 204-4, or 204-3 of FIG. 10 or elsewhere in device 10). Phased antenna arrays 124 may be formed at locations in each of regions 218, 204-2, and 220 of FIG. 11 (e.g., to allow for greater coverage at all angles around device 10 such as through the sidewalls of device 10 and through the front face of device 10) or one or more of phased antenna arrays 124-1, 124-2, and 124-3 may be omitted (e.g., to minimize space consumption within device 10 by the phased antenna arrays).

Figure 12:
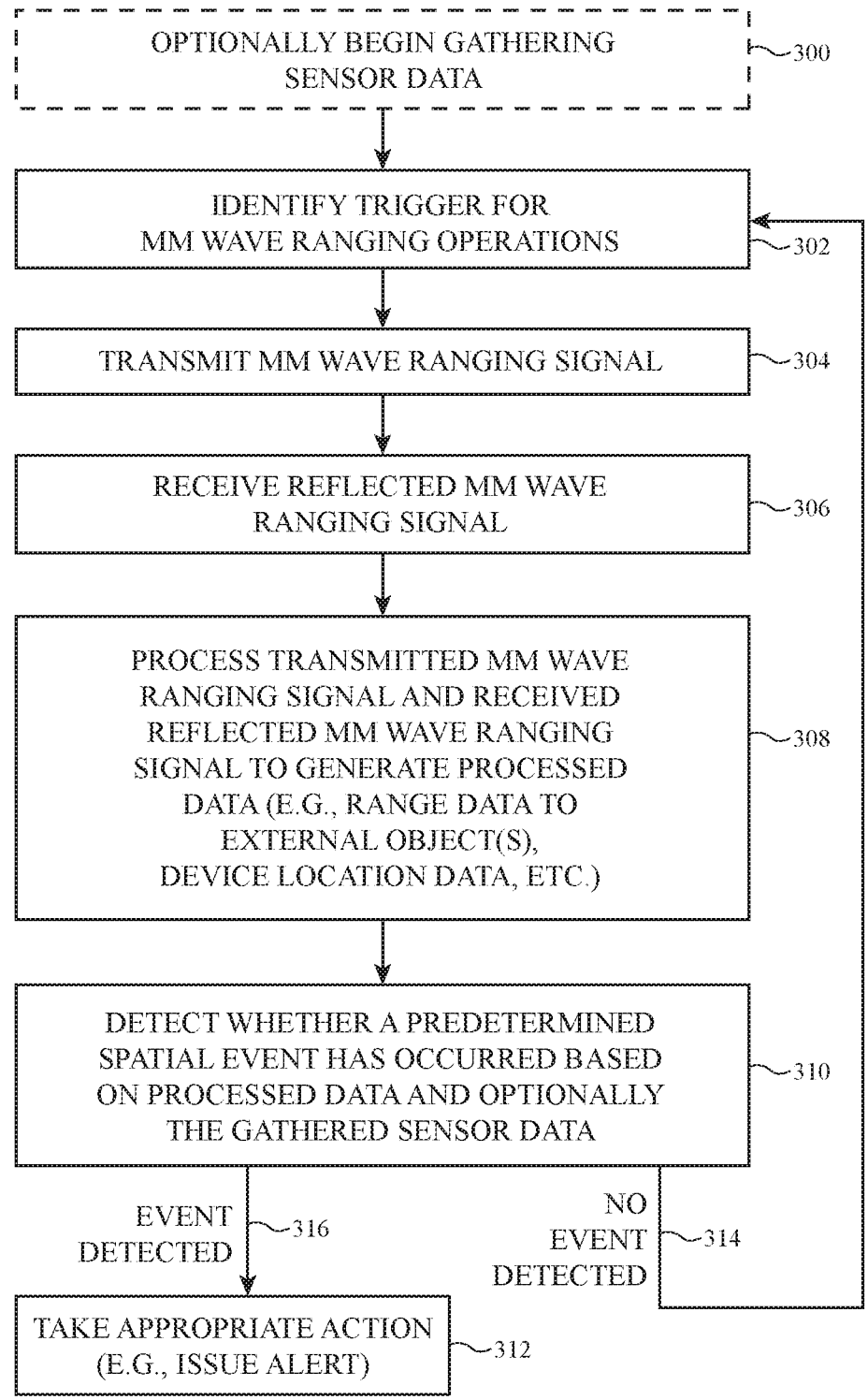
FIG. 12 is a flow chart of illustrative steps that may be performed by an electronic device to perform spatial ranging operations using phased antenna arrays of the type shown in FIGS. 5-11 in accordance with an embodiment.

FIG. 12 is a flow chart of illustrative steps that may be performed by electronic device 10 to perform spatial ranging operations using radio-frequency signals at frequencies greater than 10 GHz conveyed by one or more phased antenna arrays 124.

As shown in FIG. 12, at optional step 300, device 10 may begin gathering sensor data using sensors in input-output devices 24 of FIG. 2. For example, device 10 may begin using light sensors (e.g., infrared light sensors, visible light sensors, etc.) to gather light sensor data (e.g., visible and/or infrared image data, ambient light sensor data, etc.), motion sensors (e.g., accelerometers, gyroscopes, inertial sensors, etc.) to gather motion sensor data (e.g., information about how device 10 is being physically moved over time), capacitance sensors that gather capacitive sensor data, proximity sensors that gather proximity sensor data, magnetic sensors that gather magnetic sensor data, force sensors (e.g., force sensors coupled to a display to detect pressure applied to the display), etc.

At step 302, control circuitry 20 on device 10 (FIG. 2) may identify a trigger to begin spatial ranging operations using millimeter and/or centimeter wave signals. The trigger be, for example, a software event or trigger that is identified by a software application or operating system running on control circuitry 20, a user input (e.g., when a user turns on spatial ranging functionality of device 10 using a software tool running on control circuitry 20), etc.

Once the trigger has been identified (detected), at step 304, millimeter wave circuitry 28 (FIG. 6) may begin transmitting radio-frequency signals at a frequency greater than 10 GHz over one or more phased antenna arrays 124 (e.g., one or more phased antenna arrays 124 located at different locations on device 10 such as within regions 204-1, 204-2, 204-3, 204-4, 220, and/or 218 of FIG. 10 or other locations). Millimeter wave circuitry 28 may generate the radio-frequency signals as a predetermined series of pulses according to a RADAR protocol or other range and object detection protocol if desired. While the radio-frequency signals transmitted by millimeter wave circuitry 28 may include millimeter wave and centimeter wave signals, the radio-frequency signals transmitted by millimeter wave circuitry 28 may sometimes be referred to herein as transmitted millimeter wave ranging signals.

At step 306, millimeter wave circuitry 28 (FIG. 6) may receive a reflected version of the transmitted millimeter wave ranging signals using the one or more phased antenna arrays 124 that transmitted the millimeter wave ranging signals (e.g., while processing step 304). The reflected version of the transmitted millimeter wave ranging signals may, for example, be reflected off of an external object within the field of view of one or more phased antenna arrays 124.

At step 308, millimeter wave circuitry 28 and/or control circuitry 20 (FIG. 2) may process the transmitted millimeter wave ranging signals and the reflected version of the transmitted millimeter wave ranging signals to generate processed data. For example, control circuitry 20 may identify known sequences of pulses from the transmitted millimeter wave ranging signals in the reflected versions of the transmitted millimeter wave ranging signals. Control circuitry 20 may compare timing information between the transmitted millimeter wave ranging signals and the received millimeter wave ranging signals to generate range data associated with an external object. The range data may, for example, be indicative of a range between device 10 and the external object (e.g., the external object that reflected the transmitted millimeter wave ranging signals back towards device 10). In another suitable arrangement, control circuitry 20 may identify location information indicative of a relative location of device 10 within its environment based on the transmitted millimeter wave ranging signals and the received reflected version of the transmitted millimeter wave ranging signals. In yet another suitable arrangement, control circuitry 20 may perform external object detection or tracking to identify the presence or track the location of an external object in the vicinity of device 10. If desired, control circuitry 20 may track the distance between device 10 and many external objects in the surroundings of device 10 using the transmitted and received reflected ranging signals over time (e.g., to track the location of device 10 with respect to its surroundings over time). These examples are merely illustrative and, in general, control circuitry 20 may generate any desired processed data based on the transmitted millimeter wave ranging signals and the received reflected version of the transmitted millimeter wave ranging signals.

At step 310, control circuitry 20 may determine (detect) whether a predetermined spatial event has occurred based on the processed data (e.g., as generated while processing step 308) and/or based on gathered sensor data (e.g., as initiated while processing step 300). The predetermined spatial even may, for example, be when an external object approaches device 10 within a predetermined distance, when an external object approaches device 10 at an excessive speed, when device 10 enters or exits a predetermined spatial location relative to its surroundings, when a user of device 10 performs a predetermined physical action, when device 10 moves beyond a predetermined distance from an external object, or any other desired event associated with motion of device 10 or the location of device 10.

In scenarios where sensor data is also used for processing step 310, the sensor data may be used to filter the processed data gathered at step 308 to help to identify the predetermined spatial event if desired. In one example, the predetermined spatial event may be a fall event that occurs when a user who is wearing device 10 falls down. The sensor data may include orientation sensor data, proximity sensor data, and/or accelerometer data that may be used to distinguish between the user falling down and other scenarios where the user's wrist merely approaches an external object (e.g., such as when the user moves their arm close to a wall or other object). In another example, the predetermined spatial event may be when a user who is wearing device 10 exits a predefined spatial area and the sensor data may be used to distinguish this event from the user merely moving their wrist while wearing device 10. In yet another example, the predetermined spatial event may be when a particular object is detected within the field of view of one or more phased antenna arrays 124. These examples are merely illustrative and, in general, any desired combination of the processed data and sensor data may be used for identifying any desired spatial event associated with the positioning of device 10 relative to external objects.

If no predetermined spatial event is detected while processing step 310, processing may loop back to step 302 as shown by path 314. Device 10 may continue to perform spatial ranging operations until an event is detected or until control circuitry 20 controls device 10 to cease performing spatial ranging operations. If a predetermined spatial event is detected, processing may proceed to step 312 as shown by path 316.

At step 312, device 10 may take appropriate action in response to detecting the predetermined spatial event. For example, device 10 may issue an alert to a user (e.g., an audio alert using a speaker, a haptic alert using a vibrator or other haptic engine, and/or a visual alert using display 14 or other light emitting components on device 10), may issue an alert to another person or entity (e.g., by transmitting a text message, email message, or other wireless message or notification to another electronic device external to device 10), or may perform any other desired operation. Such an alert may serve as a warning to the user that an external object such as a wall or other obstacle is approaching the user (e.g., for visually-impaired users) or a warning to others about the user, for example.

The example of FIG. 12 is merely illustrative. If desired, step 300 may be performed concurrently with, before, or after steps 302, 304, 306, or 308. If desired, electronic device 10 may perform steps 304-308 using one or more phased antenna arrays 124 and beams of radio-frequency signals oriented (steered) in one or more directions. For example, if desired, phased antenna arrays 124 may perform beam steering operations to sweep the beam over multiple angles (e.g., all possible angles within the field of view of the phased antenna arrays) and may transmit and receive millimeter wave ranging signals over these angles for performing spatial ranging operations (e.g., to determine range information for external objects located on all sides of device 10). Other ranging operations may be performed if desired.

Figure 13:
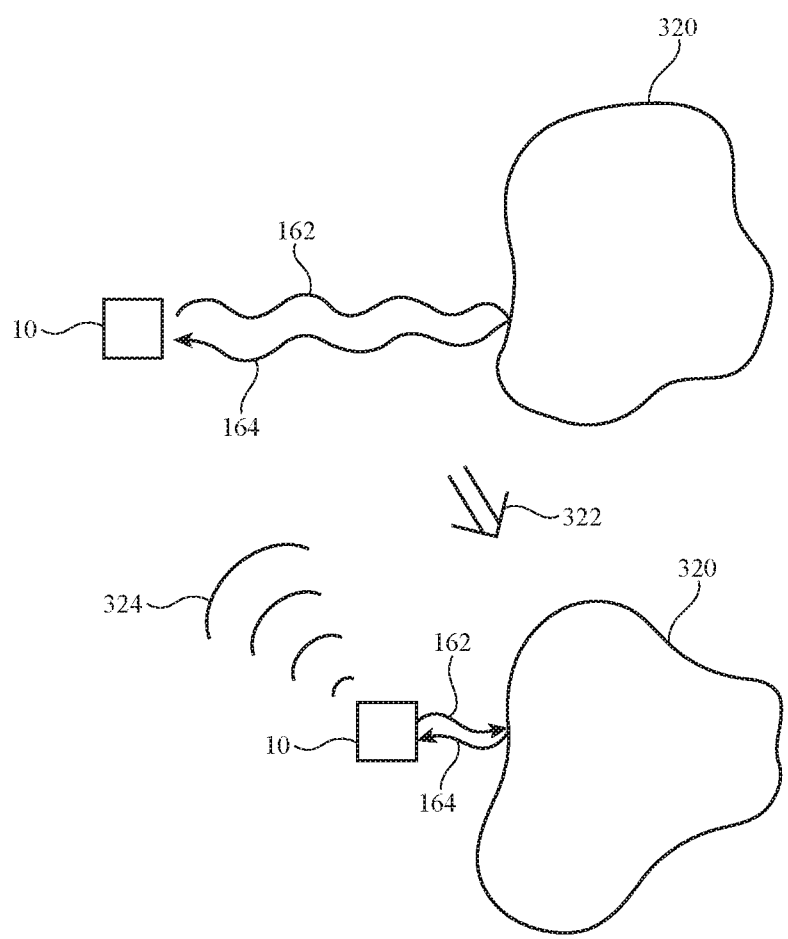
FIG. 13 is a diagram showing how an illustrative electronic device of the type shown in FIGS. 1-11 may issue an alert in response to spatial ranging operations performed using phased antenna arrays and millimeter and centimeter wave signals in accordance with an embodiment.

FIG. 13 is a diagram showing how device 10 may use millimeter wave ranging signals to identify a range between device 10 and an external object and to issue an alert in response to a predetermined spatial event. As shown in FIG. 13, at an initial time, device 10 may be located at a first distance from an external object 320. Device 10 may use one or more phased antenna arrays to transmit millimeter wave ranging signals 162. Device 10 may receive a reflected version 164 of transmitted signals 162 that have reflected off of external object 320. Device 10 may process signals 162 and 164 to identify a distance (range) between device 10 and external object 320.

At a later time, device 10 may move closer to external object 320, as shown by arrow 322. Device 10 may again transmit millimeter wave ranging signals 162 and receive reflected version 164 of transmitted signals 162 that have reflected off of external object 320. Device 10 may process signals 162 and 164 to identify the new range between device 10 and external object 320. Device 10 may continually process this range information to determine whether a predetermined spatial event has occurred (e.g., while processing step 310 of FIG. 12). For example, device 10 may compare the range to a predetermined minimum threshold range. In response to determining that external object 320 has moved closer to device 10 than the predetermined minimum threshold range, device 10 may issue an alert 324.

Alert 324 may, for example, include an audio or haptic warning to the user of device 10 (e.g., a user who is wearing device 10 on their wrist) to warn the user that object 320 has approached the user. Other sensor data may be combined with the range data in determining whether to issue alert 324 if desired. In another suitable arrangement, alert 324 may be a radio-frequency signal that is sent to an external device (e.g., using a WLAN, WPAN, or cellular telephone link and non-millimeter wave antenna 40S) to notify the external device that object 320 has passed within the predetermined minimum threshold range. The example of FIG. 13 is merely illustrative and, in general, any desired spatial event may be monitored using millimeter wave ranging signals 162. In this way, device 10 may continually track the distance between device 10 and its surroundings using millimeter wave signals transmitted by one or more phased antenna arrays 124 that are co-located or located adjacent to other non-millimeter wave antennas such as antenna 40S of FIG. 10, thereby optimizing space consumption within device 10.

The foregoing is merely illustrative and various modifications can be made to the described embodiments. The foregoing embodiments may be implemented individually or in any combination.

What is claimed is:

1. An electronic device, comprising:
    a housing having conductive housing walls;
    a display cover layer;
    a display module that is overlapped by the display cover layer and that includes conductive display structures;
    an antenna feed for an antenna having a first feed terminal coupled to the conductive display structures and a second feed terminal coupled to the conductive housing walls, wherein the conductive display structures and the conductive housing walls define edges of a slot element for the antenna; and
    a phased antenna array mounted within the housing, wherein the antenna is configured to convey first radio-frequency signals at a first frequency below 10 GHz and the phased antenna array is configured to convey second radio-frequency signals at a second frequency between 10 GHz and 300 GHz.

2. The electronic device defined in claim 1, wherein the phased antenna array is mounted within the slot element for the antenna and is configured to transmit the second radio-frequency signals through the display cover layer.

3. The electronic device defined in claim 2, wherein the phased antenna array is at least partially embedded within the display cover layer.

4. The electronic device defined in claim 1, wherein a dielectric window is formed in a given one of the conductive housing walls and the phased antenna array is configured to transmit the second radio-frequency signals through the dielectric window.

5. The electronic device defined in claim 4, further comprising:
    an additional phased antenna array mounted within the housing, wherein the additional phased antenna array is mounted within the slot element for the antenna.

6. The electronic device defined in claim 1, further comprising:
    a spatial filter in the conductive display structures, wherein the spatial filter has a pass band that includes the second frequency and the phased antenna array is configured to transmit the second radio-frequency signals through the display module via the spatial filter and through the display cover layer.

7. The electronic device defined in claim 6, wherein a dielectric window is formed in a given one of the conductive housing walls, the electronic device further comprising:
    an additional phased antenna array mounted within the housing, wherein the additional phased antenna array is configured to transmit third radio-frequency signals at a third frequency between 10 GHz and 300 GHz through the dielectric window.

8. The electronic device defined in claim 1, further comprising:
    a radio-frequency transceiver coupled to the antenna feed;
    a transmitter and a receiver coupled to the phased antenna array, wherein the transmitter is configured to transmit the second radio-frequency signals and the receiver is configured to receive a reflected version of the second radio-frequency signals that is received by the phased antenna array; and
    control circuitry configured to detect a range of an external object within a field of view of the phased antenna array with respect to the electronic device based on the transmitted second radio-frequency signals and the received reflected version of the second radio-frequency signals.

9. The electronic device defined in claim 8, further comprising:
    an accelerometer configured to generate motion data indicative of motion of the electronic device, wherein the control circuitry is configured to detect a predetermined spatial event based on the detected range and the motion data.

10. The electronic device defined in claim 8, further comprising:
    a switch having a first terminal coupled to the transmitter, a second terminal coupled to the receiver, and a third terminal coupled to the phased antenna array, wherein the switch is configured to couple a selected one of the transmitter and the receiver to the phased antenna array at a given time.

11. The electronic device defined in claim 1, wherein the housing is configured to receive a wrist strap.

12. The electronic device defined in claim 11, wherein the display cover layer and the display module form a touch screen, and the phased antenna array is configured to convey the second radio-frequency signals through the display cover layer of the touch screen.

13. The electronic device defined in claim 1, wherein the phased antenna array has an elongated dimension that extends along an elongated dimension of the slot element.

14. The electronic device defined in claim 13, wherein the phased antenna array comprises a one-dimensional array of antennas.

* * * * *